US012682495B2

(12) United States Patent
Sakai et al.

(10) Patent No.: US 12,682,495 B2
(45) Date of Patent: Jul. 14, 2026

(54) AUTOMATIC MEASURING SYSTEMS AND CONTROL METHOD FOR AUTOMATIC MEASURING SYSTEMS

(71) Applicant: MITUTOYO CORPORATION, Kanagawa (JP)

(72) Inventors: Daisuke Sakai, Saitama (JP); Seiji Sasaki, Saitama (JP); Kunio Ueda, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 89 days.

(21) Appl. No.: 18/631,483

(22) Filed: Apr. 10, 2024

(65) Prior Publication Data

US 2024/0346694 A1 Oct. 17, 2024

(30) Foreign Application Priority Data

Apr. 14, 2023 (JP) ................................. 2023-066774
Apr. 8, 2024 (JP) ................................. 2024-062339

(51) Int. Cl.
*G06T 7/80* (2017.01)
*G01B 5/20* (2006.01)
(Continued)

(52) U.S. Cl.
CPC .................. *G06T 7/80* (2017.01); *G01B 5/20* (2013.01); *G01N 35/0099* (2013.01); *G06T 7/60* (2013.01); *G06T 2207/30204* (2013.01)

(58) Field of Classification Search
CPC ... G06T 7/80; G06T 7/60; G06T 2207/30204; G06T 7/73; G01B 5/20; G01B 21/042; G01N 35/0099
See application file for complete search history.

(56) References Cited

U.S. PATENT DOCUMENTS 8,601,704 B2 * 12/2013 Dalla Casa .............. G01B 3/46
                                                    33/542
8,711,365 B2 * 4/2014 Christoph ............ G01B 11/245
                                                    33/503
(Continued)

FOREIGN PATENT DOCUMENTS

DE      19625542 A1 * 1/1998 ........... G05B 19/401
DE      20003381 U1 * 7/2001 ........... B25J 9/1692
(Continued)

OTHER PUBLICATIONS

U.S. Appl. No. 18/630,618 to Sasaki et al., filed Apr. 9, 2024.

*Primary Examiner* — Sihar A Karwan
(74) *Attorney, Agent, or Firm* — Greenblum & Bernstein, P.L.C.

(57) ABSTRACT

An automatic measuring system includes a measuring sensor tool that detects a surface of an object to be measured to measure a dimension or a shape of the object to be measured, a moving mechanism that relatively moves the measuring sensor tool with respect to the object to be measured, and an observation camera that images the object to be measured. A position and an orientation (posture) of a point to be measured are acquired from image data obtained by imaging the object to be measured by the observation camera, the measuring sensor tool is caused by the moving mechanism to approach the point to be measured, taking into account a position and posture offset between the observation camera and the measuring sensor tool, and a measurement value of the point to be measured is acquired by the measuring sensor tool.

9 Claims, 18 Drawing Sheets

(51) Int. Cl.
   *G01N 35/00*        (2006.01)
   *G06T 7/60*        (2017.01)

(56)        References Cited

U.S. PATENT DOCUMENTS

| 9,078,708 | B2 * | 7/2015 | Haas | A61B 17/7065 |
| 9,192,414 | B2 * | 11/2015 | Haas | A61B 17/7062 |
| 9,226,781 | B2 * | 1/2016 | Smisson, III | A61B 17/7055 |
| 9,585,699 | B2 * | 3/2017 | Robinson | A61B 17/88 |
| 2009/0108862 | A1 * | 4/2009 | Ni | G01R 31/2806 |
| | | | | 324/750.25 |
| 2010/0005676 | A1 * | 1/2010 | Fujikawa | G01B 3/008 |
| | | | | 33/542 |
| 2010/0201806 | A1 * | 8/2010 | Nygaard | G01B 11/2433 |
| | | | | 356/243.1 |
| 2018/0272535 | A1 * | 9/2018 | Ogawa | B25J 13/085 |
| 2024/0345116 | A1 * | 10/2024 | Sasaki | G01B 5/12 |
| 2024/0346694 | A1 * | 10/2024 | Sakai | G06T 7/80 |

FOREIGN PATENT DOCUMENTS

| DE | 102024104907 | A1 * | 8/2025 | G06V 20/60 |
| EP | 2284480 | A2 * | 2/2011 | G01B 21/045 |
| EP | 3336583 | A1 * | 6/2018 | G01S 7/51 |
| EP | 4607300 | A1 * | 8/2025 | G06V 20/60 |
| JP | H0827183 | B2 * | 3/1996 | |
| JP | 2010-019783 | | 1/2010 | |
| JP | 5439833 | | 3/2014 | |
| JP | 2020169914 | A * | 10/2020 | |
| JP | 2021-009115 | | 1/2021 | |
| JP | 2024152529 | A * | 10/2024 | G01B 21/14 |
| JP | 2024152665 | A * | 10/2024 | |
| WO | WO-2005108020 | A1 * | 11/2005 | B25J 9/1692 |
| WO | WO-2006063838 | A1 * | 6/2006 | G01B 5/0014 |
| WO | WO-2015158334 | A1 * | 10/2015 | B25J 19/022 |
| WO | WO-2018097784 | A1 * | 5/2018 | B25J 19/023 |
| WO | WO-2024104672 | A1 * | 5/2024 | B25J 9/162 |

* cited by examiner

2310

2300

2320

2320

2310

2300

2320

2320

2510
(2500)

2400

2300

2400

2510
(2500)

2300

2510
(2500)

2400

2300

2330

2310

Xt

KNOWN VALUE      Yt

Zt

ST400

CALIBRATING STEP

ST500

MEASURING STEP

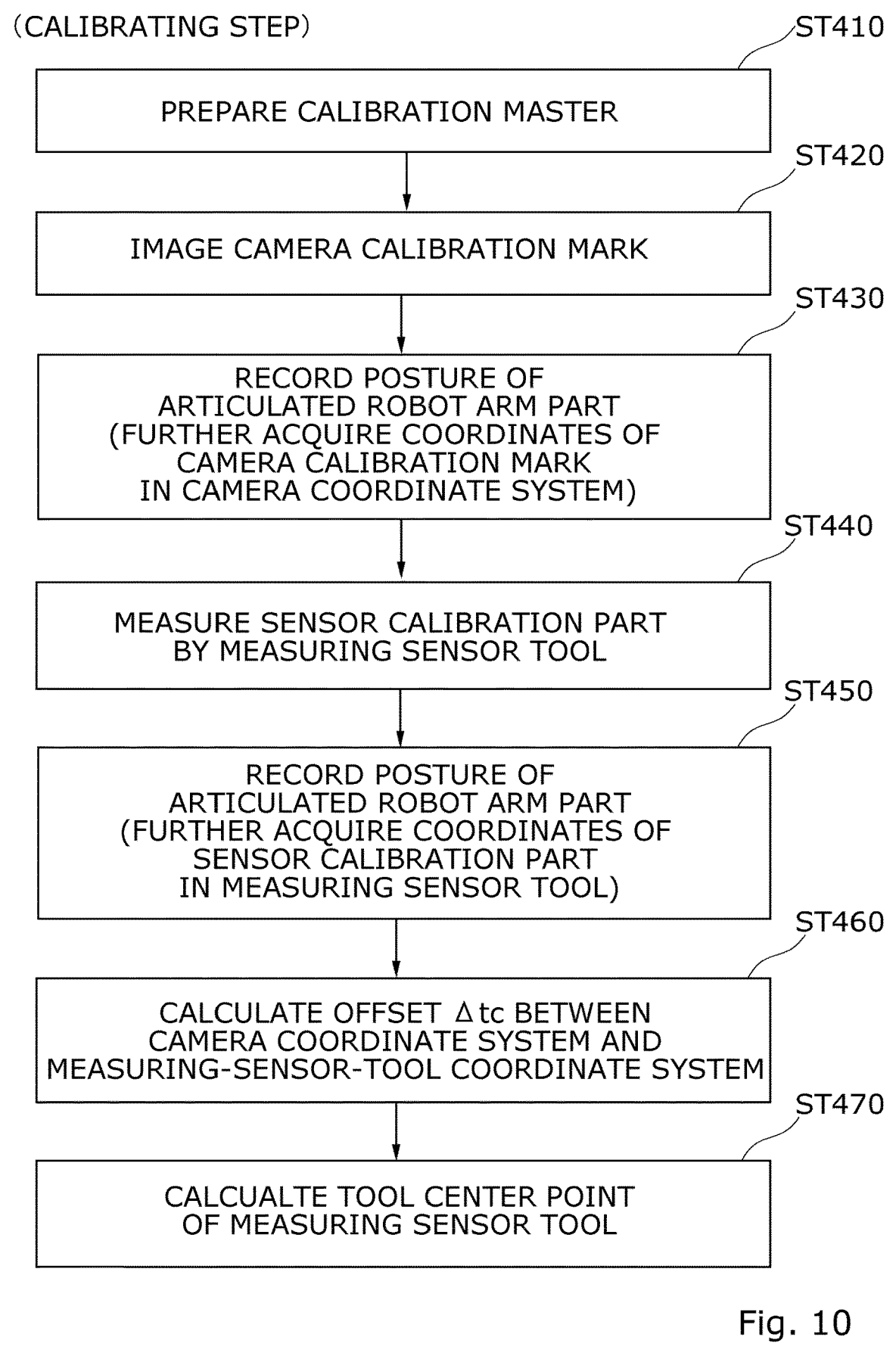

（CALIBRATING STEP）                                                ST410

PREPARE CALIBRATION MASTER

ST420

IMAGE CAMERA CALIBRATION MARK

ST430

RECORD POSTURE OF
ARTICULATED ROBOT ARM PART
(FURTHER ACQUIRE COORDINATES OF
CAMERA CALIBRATION MARK
IN CAMERA COORDINATE SYSTEM)

ST440

MEASURE SENSOR CALIBRATION PART
BY MEASURING SENSOR TOOL

ST450

RECORD POSTURE OF
ARTICULATED ROBOT ARM PART
(FURTHER ACQUIRE COORDINATES OF
SENSOR CALIBRATION PART
IN MEASURING SENSOR TOOL)

ST460

CALCULATE OFFSET $\Delta tc$ BETWEEN
CAMERA COORDINATE SYSTEM AND
MEASURING-SENSOR-TOOL COORDINATE SYSTEM

ST470

CALCUALTE TOOL CENTER POINT
OF MEASURING SENSOR TOOL

Fig. 10

(MEASURING STEP)

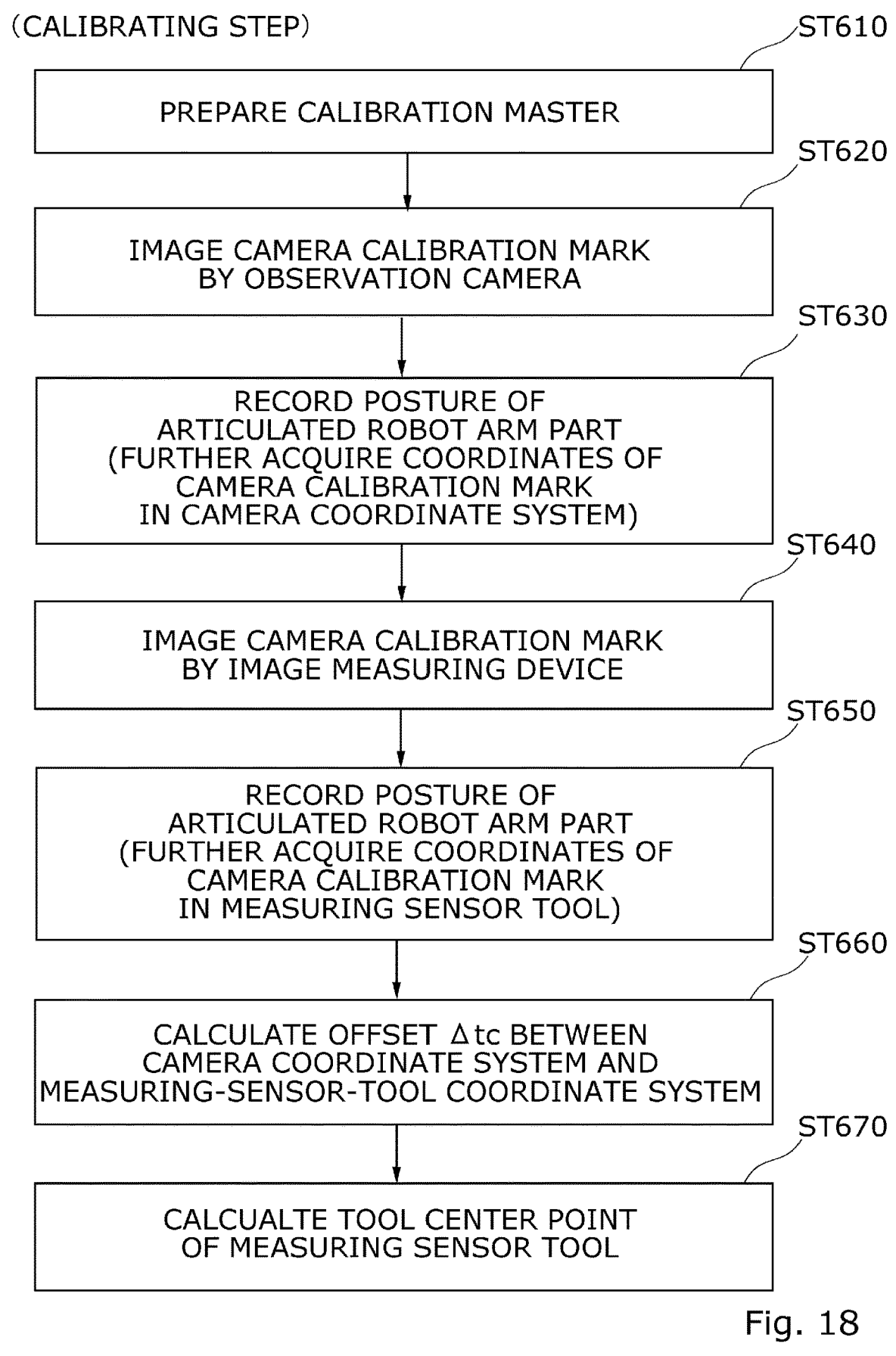

(CALIBRATING STEP)

ST610

| PREPARE CALIBRATION MASTER |
| --- |

ST620

| IMAGE CAMERA CALIBRATION MARK BY OBSERVATION CAMERA |
| --- |

ST630

| RECORD POSTURE OF ARTICULATED ROBOT ARM PART (FURTHER ACQUIRE COORDINATES OF CAMERA CALIBRATION MARK IN CAMERA COORDINATE SYSTEM) |
| --- |

ST640

| IMAGE CAMERA CALIBRATION MARK BY IMAGE MEASURING DEVICE |
| --- |

ST650

| RECORD POSTURE OF ARTICULATED ROBOT ARM PART (FURTHER ACQUIRE COORDINATES OF CAMERA CALIBRATION MARK IN MEASURING SENSOR TOOL) |
| --- |

ST660

| CALCULATE OFFSET $\Delta$tc BETWEEN CAMERA COORDINATE SYSTEM AND MEASURING-SENSOR-TOOL COORDINATE SYSTEM |
| --- |

ST670

| CALCUALTE TOOL CENTER POINT OF MEASURING SENSOR TOOL |
| --- |

Fig. 18

AUTOMATIC MEASURING SYSTEMS AND CONTROL METHOD FOR AUTOMATIC MEASURING SYSTEMS

INCORPORATION BY REFERENCE

This application is based upon and claims the benefit of priority from JP patent applications No. 2023-066774, filed on Apr. 14, 2023 (DAS code E2BB) and No. 2024-062339, filed on Apr. 8, 2024 (DAS code BC8A), the disclosure of which is incorporated herein in its entirety by reference.

BACKGROUND OF THE INVENTION

1. Field of the Invention

The present invention relates to an automatic measuring system and a control method for the automatic measuring system.

2. Description of Related Art

Measuring devices for measuring the inside diameter of a hole are inside-diameter measuring devices, such as hole tests, cylinder gauges, and Borematic (registered trademark) (see, for example, JP 2010-19783 A).

Although such small-sized dimensional shape measuring devices are assumed to be manually operated, there is a demand to fully automate the measurement of dimensions or shapes that are manually performed, due to the recent labor shortage and to further improve measurement efficiency.

Therefore, the present applicant has proposed an automatic inside-diameter measuring system as disclosed in, for example, JP 2021-9115 A, in which an electrically driven inside-diameter measuring device is attached to the tip of an articulated robot arm to measure points to be measured automatically and sequentially.

Patent Literature 1: JP 2010-19783A
Patent Literature 2: JP 2021-9115 A
Patent Literature 3: JP 5439833 B

SUMMARY OF THE INVENTION

To measure a diameter (dimension) of a hole by an electric inside-diameter measuring device, the electric inside-diameter measuring device needs to be inserted into the hole to be measured by the movement of a hand part of an articulated robot arm, but the gap between the measuring head of the electric inside-diameter measuring device and the inner wall of the hole to be measured is extremely small (about a few millimeters). If the electric inside-diameter measuring device is not inserted accurately into the hole to be measured, the measuring head can collide with an object to be measured. Alternatively, even if a non-contact measuring device is used instead of a contact-type measuring device, such as an inside-diameter measuring device, measurement errors can occur due to adjustment errors in the distance and relative posture between the non-contact measuring device and an object to be measured.

For this reason, a tool center point (TCP) to control the position and posture of the measurement device attached to the hand part of a robot is desired to be set accurately.

However, a conventionally known method for setting a tool center point (TCP) is the following method (JP 5439833 B).

First, a tool needs to have a sharp point at the top of the tool (this is referred to as a tool tip point). In addition, a calibration jig having a single sharp point (reference point) is prepared. The tool tip point is brought into contact with the reference point of the fixed calibration jig. While the contact between the tool tip point and the reference point is maintained, the posture of the robot arm is changed in several patterns (for example, four patterns). The tool center point (TCP) is obtained by solving a simultaneous equation on the assumption that the tool tip point (reference point) is an immovable point that does not move.

However, if a measuring head is large and has no sharp point, as in an inside-diameter measuring device (for example, Hall test), it is not possible to set a tool center point (TCP) with the above method.

An alternative conceivable method is to prepare a dedicated calibration tool having a sharp point at the tip (tool tip point) that matches an inside-diameter measuring device (for example, Hall test), and to replace the tool with an electric inside-diameter measuring device after a TCP is set by the dedicated calibration tool. However, it is difficult and costly to prepare dedicated calibration tools for respective types and sizes of measuring devices, and the installation error when replacing tools is also a problem that cannot be ignored.

A purpose of the present invention is to provide a method for a moving mechanism, such as a robot or the like, to accurately control a measuring device to an object to be measured.

A control method for an automatic measuring system according to an exemplary embodiment of the present invention, the automatic measuring system including:

a measuring sensor tool that detects a surface of an object to be measured to measure a dimension or a shape of the object to be measured;

a moving mechanism that relatively moves the measuring sensor tool with respect to the object to be measured; and an observation camera that images the object to be measured, the control method includes:

a camera calibration mark imaging step of imaging, by the observation camera, a camera calibration mark;

a sensor calibration part step of measuring, by the measuring sensor tool, a sensor calibration part; and a step of calibrating a position and posture offset between the observation camera and the measuring sensor tool, based on a position and a posture of the moving mechanism and image data acquired in the camera calibration mark imaging step, and on a position and a posture of the moving mechanism and measurement data acquired in the sensor calibration part step, in which the camera calibration mark and the sensor calibration part are provided in a calibration master, and the camera calibration mark and the sensor calibration part have a known relative position.

In an exemplary embodiment of the present invention, it is preferable that the moving mechanism is one articulated robot, the one articulated robot includes a hand part, and the hand part holds the observation camera and the measuring sensor tool.

In an exemplary embodiment of the present invention, it is preferable that the hand part of the articulated robot includes an exchange means for moving the observation camera and the measuring sensor tool to exchange a position of the observation camera for a position of the measuring sensor tool.

In an exemplary embodiment of the present invention, it is preferable that the measuring sensor tool is a measuring device that brings a probe into contact with the object to be measured at a predetermined measurement pressure to measure the dimension of the object to be measured, and the contact between the probe and the object to be measured is not a point, but a line or a plane.

In an exemplary embodiment of the present invention, it is preferable that the measuring sensor tool is an image measuring device including a telecentric lens.

In an exemplary embodiment of the present invention, it is preferable that a part or all of the camera calibration mark and a part or all of the sensor calibration part are identical and commonly used.

In an exemplary embodiment of the present invention, it is preferable that the measuring sensor tool is an image measuring device including a telecentric lens, the exchange means exchanges the position of the observation camera for the position of the measuring sensor tool, and the observation camera and the measuring sensor tool are attached to the exchange means in such a manner that a focus plane of the observation camera when imaging the object to be measured is on the same plane as a focus plane of the measuring sensor tool when measuring the object to be measured.

A control method for an automatic measuring system according to an exemplary embodiment of the present invention, the automatic measuring system including:

a measuring sensor tool that detects a surface of an object to be measured to measure a dimension or a shape of the object to be measured;

a moving mechanism that relatively moves the measuring sensor tool with respect to the object to be measured; and an observation camera that images the object to be measured, the control method includes:

acquiring a position and a posture of a point to be measured from image data obtained by imaging the object to be measured by the observation camera;

causing, by the moving mechanism, the measuring sensor tool to approach the point to be measured, taking into account a position and posture offset between the observation camera and the measuring sensor tool; and acquiring, by the measuring sensor tool, a measurement value of the point to be measured.

An automatic measuring system according to an exemplary embodiment of the present invention includes:

a measuring sensor tool that detects a surface of an object to be measured to measure a dimension or a shape of the object to be measured;

a moving mechanism that relatively moves the measuring sensor tool with respect to the object to be measured; and an observation camera that images the object to be measured, in which the moving mechanism is one articulated robot, the one articulated robot includes a hand part, the hand part includes an exchange means for moving the observation camera and the measuring sensor tool to exchange a position of the observation camera for a position of the measuring sensor tool, and the hand part holds the observation camera and the measuring sensor tool via the exchanging means.

A recording medium storing a control program for an automatic measuring system according to an exemplary embodiment of the present invention, the automatic measuring system including:

a measuring sensor tool that detects a surface of an object to be measured to measure a dimension or a shape of the object to be measured;

a moving mechanism that relatively moves the measuring sensor tool with respect to the object to be measured;

an observation camera that images the object to be measured; and a computer, the control program causes the computer to execute:

a camera calibration mark imaging step of imaging, by the observation camera, a camera calibration mark;

a sensor calibration part step of measuring, by the measuring sensor tool, a sensor calibration part; and a step of calibrating a position and posture offset between the observation camera and the measuring sensor tool, based on a position and a posture of the moving mechanism and image data acquired in the camera calibration mark imaging step, and on a position and a posture of the moving mechanism and measurement data acquired in the sensor calibration part step, in which the camera calibration mark and the sensor calibration part are provided in a calibration master, and the camera calibration mark and the sensor calibration part have a known relative position.

A recording medium storing a control program for an automatic measuring system according to an exemplary embodiment of the present invention, the automatic measuring system including:

a measuring sensor tool that detects a surface of an object to be measured to measure a dimension or a shape of the object to be measured;

a moving mechanism that relatively moves the measuring sensor tool with respect to the object to be measured;

an observation camera that images the object to be measured; and a computer, the control program causes the computer to execute:

acquiring a position and a posture of a point to be measured from image data obtained by imaging the object to be measured by the observation camera;

causing, by the moving mechanism, the measuring sensor tool to approach the point to be measured, taking into account a position and posture offset between the observation camera and the measuring sensor tool; and acquiring, by the measuring sensor tool, a measurement value of the point to be measured.

BRIEF DESCRIPTION OF THE DRAWINGS

FIG. 10 is a flowchart for explaining a procedure of a calibrating step;

FIG. 18 is a flowchart for explaining a procedure of a calibrating step in the second exemplary embodiment.

DETAILED DESCRIPTION

Figure 1:
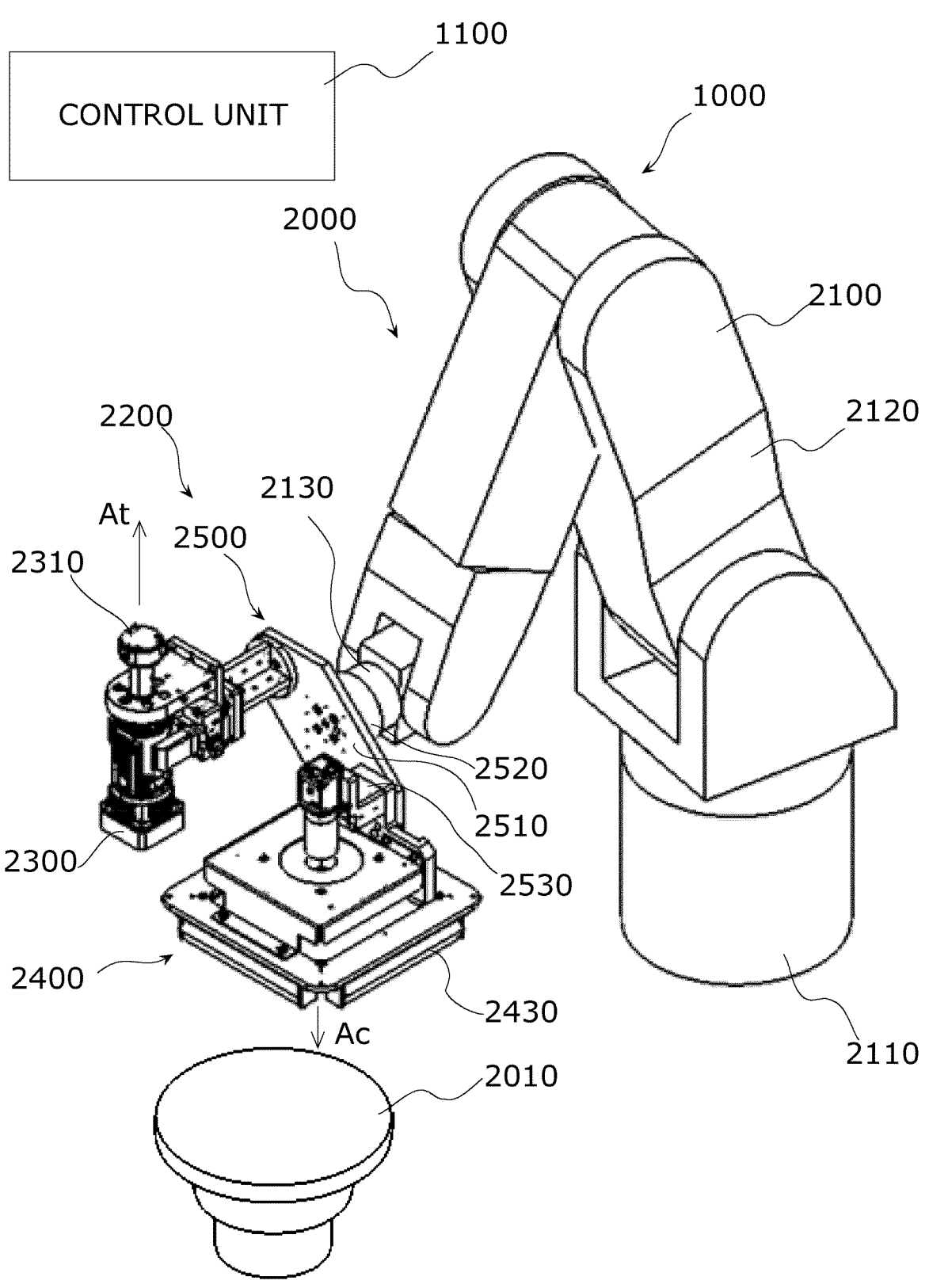
FIG. 1 is an overall external view of an automatic measuring system (in a posture for using an observation camera)

Embodiments of the present invention are illustrated and described with reference to the reference signs assigned to the elements in the drawings.

First Exemplary Embodiment

In the following, a first exemplary embodiment of the present invention is described.

The present exemplary embodiment describes an automatic measuring system 1000 that automates measurement of a dimension or a shape of an object to be measured.

The first embodiment describes a case in which a point to be measured is an inside diameter of a hole formed in the object to be measured (workpiece), and therefore a measuring sensor tool is an electric inside-diameter measuring unit 2300.

Figure 2:
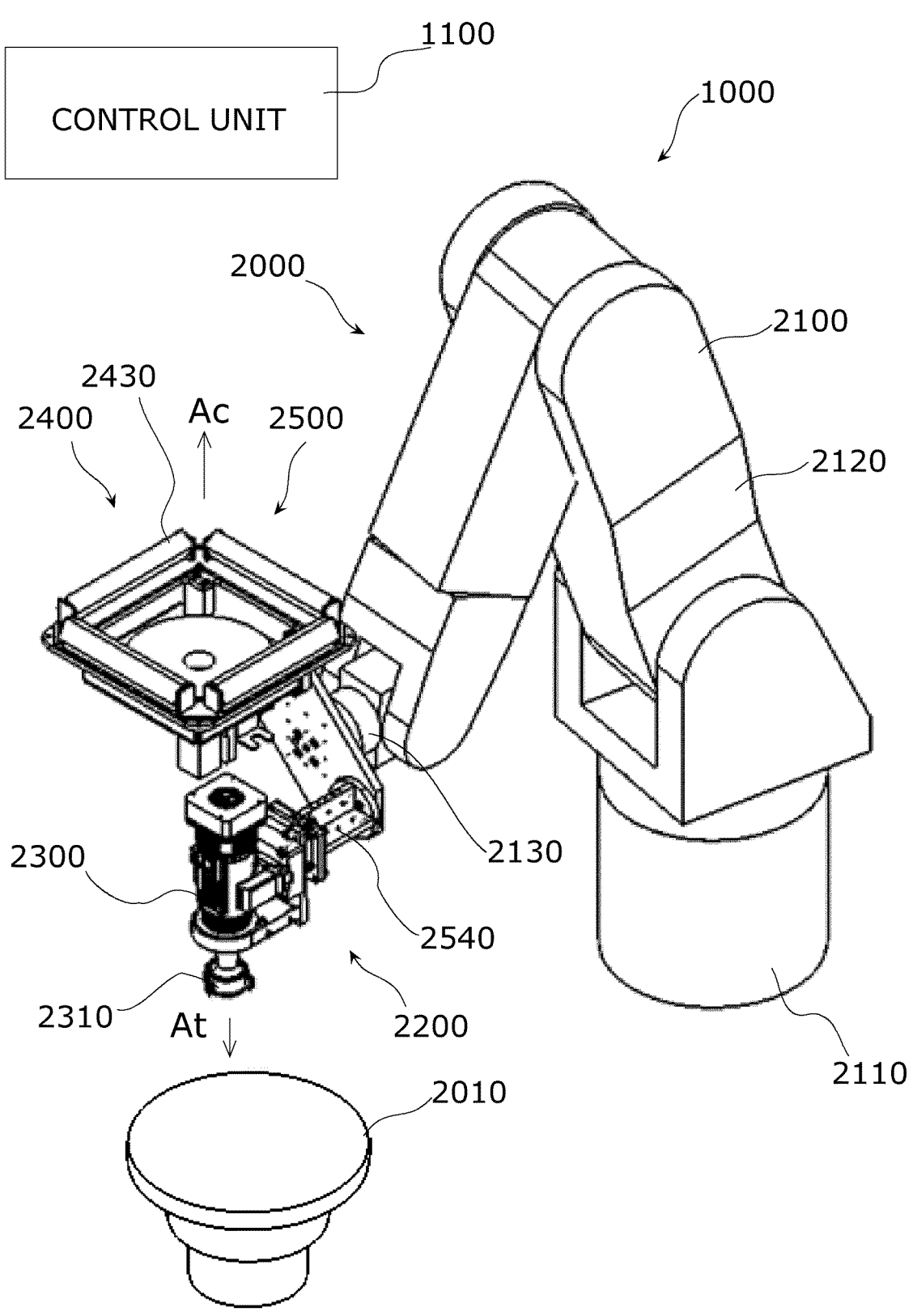
FIG. 2 is an overall external view of the automatic measuring system (in a posture for using a measuring sensor tool)

FIGS. 1 and 2 are overall external views of the automatic measuring system 1000.

The automatic measuring system 1000 includes a measuring-device main body 2000 and a control unit 1100 that controls the overall operation.

(Measuring-Device Main Body 2000)

The measuring-device main body 2000 includes an articulated robot (articulated robot arm part) 2100 as a moving mechanism, and a tool unit 2200 attached to a hand part 2130 of the articulated robot arm part 2100.

The articulated robot arm part 2100 is what is called a robot arm, and moves the hand part 2130, which is the tip of the robot arm part 2100, in three dimensions with a plurality of rotary drive axes.

The measuring-device main body 2000 may further include a rotary table 2010, in which case the rotary table

2010 is also to be integrated and controlled as part of the articulated robot arm part 2100.

The articulated robot arm part 2100 includes a base part 2110 to be installed on the floor or the like, a multi-axis arm part 2120 supported by the base part 2110, and a hand part 2130 provided at the tip of the arm part 2120.

Coordinate axes for controlling the articulated robot arm part 2100 include a reference coordinate system set using the base part 2110 as a reference and a flange coordinate system set on the rotation axis (J6 axis) of the hand part 2130.

The reference coordinate system is a coordinate system fixedly set to a floor surface or the like, for example, and the reference coordinate system does not change even if the posture of the articulated robot arm part 2100 changes.

The flange coordinate system is a coordinate axis used to represent the orientation and rotation of the hand part 2130.

Figure 3:
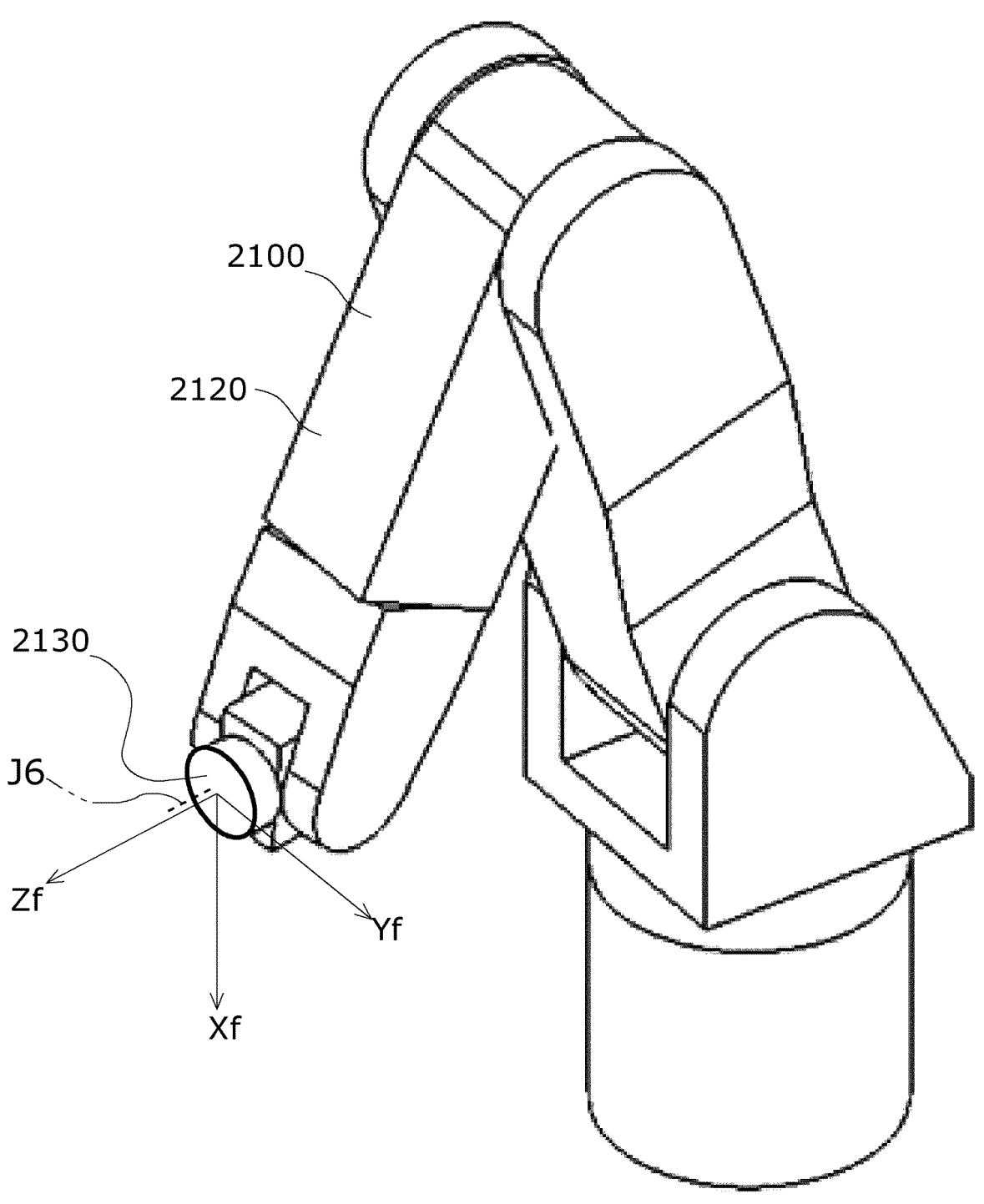
FIG. 3 is a diagram showing an example of a flange coordinate system.

FIG. 3 is a diagram showing an example of the flange coordinate system.

In the flange coordinate system, a Zf axis is coaxial with the rotation axis (J6 axis) of the hand part 2130, and two axes orthogonal to Zf are referred to as an Xf axis and a Yf axis.

Since the reference coordinate system and the flange coordinate system are coordinate systems set in the robot, the reference coordinate system and the flange coordinate system are integrated and referred to as a robot coordinate system.

When the articulated robot arm part 2100 is shipped, that is, when the articulated robot arm part 2100 is purchased, the reference coordinate system and the flange coordinate system are set. The user who has purchased the articulated robot arm part 2100 attaches a tool, such as a measuring device, to the hand part 2130 to use it. In this case, the tool coordinate system for controlling the position or orientation of the tool (measuring device or the like) is set by an operator who uses the articulated robot arm part 2100, that is, the automatic measuring system 1000.

The tool unit 2200 includes an electric inside-diameter measuring unit 2300 that measures the diameter of a hole to be measured, an observation camera 2400, and an exchange means 2500.

The electric inside-diameter measuring unit 2300 is what the feed of a rod of an inside-diameter measuring device (for example, a Hall test) is motorized. In other words, the electric inside-diameter measuring unit 2300 moves the probe 2320 forward and backward by the power of a motor 2330, instead of being manually operated. That is, in order to measure the inside diameter of a hole to be measured, a measuring head part 2310 of the electric inside-diameter measuring unit 2300 is first inserted into the hole to be measured by moving the hand part 2130 of the articulated robot arm part 2100. After the measuring head part 2310 of the electric inside-diameter measuring unit 2300 is inserted into the hole to be measured, the drive of the articulated robot arm part 2100 is stopped, and then the motor 2330 of the electric inside-diameter measuring unit 2300 is driven to automatically move the probe 2320 forward and backward and bring the probe 2320 into contact with the inner wall of the hole to acquire a measurement value of the hole diameter.

Figure 4A:
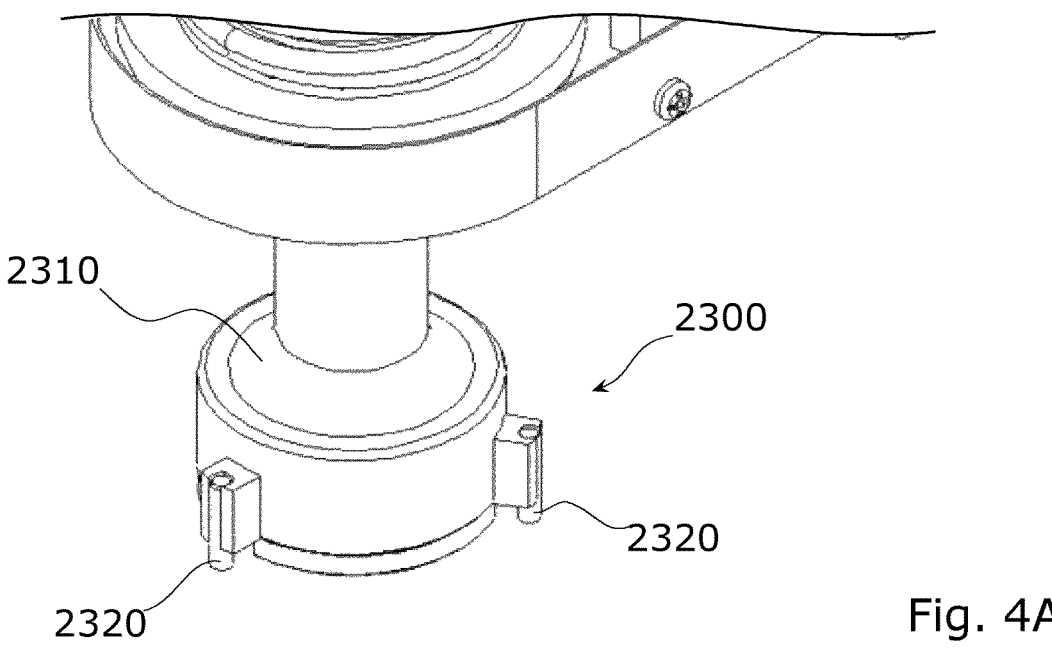
FIG. 4A is a diagram showing that a probe is moved backward.
Figure 4B:
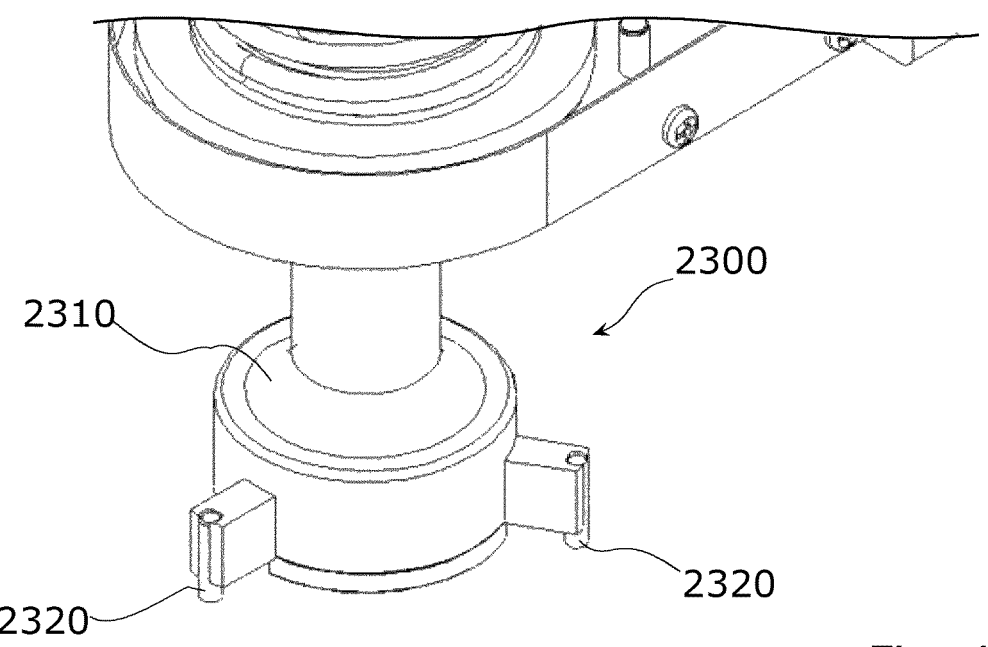
FIG. 4B is a diagram showing the probe is moved forward.

FIG. 4A shows that the probe 2320 is moved backward, and FIG. 4B shows that the probe 2320 is moved forward.

The observation camera 2400 includes a lens 2410, an image sensor 2420, and a ring illumination 2430. The camera lens 2410 is a standard lens, not a lens for a telecentric lens system.

The exchange means 2500 exchanges the position of the electric inside-diameter measuring unit 2300 for the position of the observation camera 2400. The exchange means 2500 is a U-shaped member as a whole and supports the electric inside-diameter measuring unit 2300 and the observation camera 2400 at the respective ends of the U-shape. The exchange means 2500 includes a flat, elongate rotary plate 2510. On the rear face side of the rotary plate 2510, a coupling part 2520 is provided at the center point in the longitudinal direction, and the exchange means 2500 is coupled to the hand part 2130 by the coupling part 2520. By rotating the hand part 2130, the exchange means 2500 is rotated together with the hand part 2130 around the rotation axis (J6 axis). On the front face side of the rotary plate 2510, a camera attaching column 2530 and a measuring-device attaching column 2540 are attached at right angles to the rotary plate 2510. The camera attaching column 2530 and measuring-device attaching column 2540 are attached to the respective ends of the rotary plate 2510. The observation camera 2400 is attached to the camera attaching column 2530, and the electric inside-diameter measuring unit 2300 is attached to the measuring-device attaching column 2540.

In the observation camera 2400, a direction parallel to the optical axis and toward an object to be imaged is referred to as an imaging direction Ac. In the electric inside-diameter measuring unit 2300, a direction parallel to the center line and from the center of gravity of the electric inside-diameter measuring unit 2300 toward the measuring head part 2310 is referred to as a measuring head direction At. The imaging direction is parallel and opposite to the measuring head direction. Therefore, when the hand part 2130 (J6 axis) is rotated in such a manner that the rotary plate 2510 (the exchange means 2500) is rotated 180°, the positions of the observation camera 2400 and the electric inside-diameter measuring unit 2300 are exchanged.

In FIG. 1, the measuring head direction At of the electric inside-diameter measuring unit 2300 is upward, and the imaging direction Ac of the observation camera 2400 is downward.

In FIG. 2, the measuring head direction At of the electric inside-diameter measuring unit 2300 is downward, and the imaging direction Ac of the observation camera 2400 is upward.

When the measuring head direction At of the electric inside-diameter measuring unit 2300 is downward and vertical, the observation camera 2400 and the electric inside-diameter measuring unit 2300 are not at the same height, but the observation camera 2400 is above the electric inside-diameter measuring unit 2300. That is, the observation camera 2400 and the electric inside-diameter measuring unit 2300 are attached to the respective columns 2530 and 2540 at the same inclination angle with respect to the longitudinal direction of the rotary plate 2510.

Figures 5A, 5B, 5C:
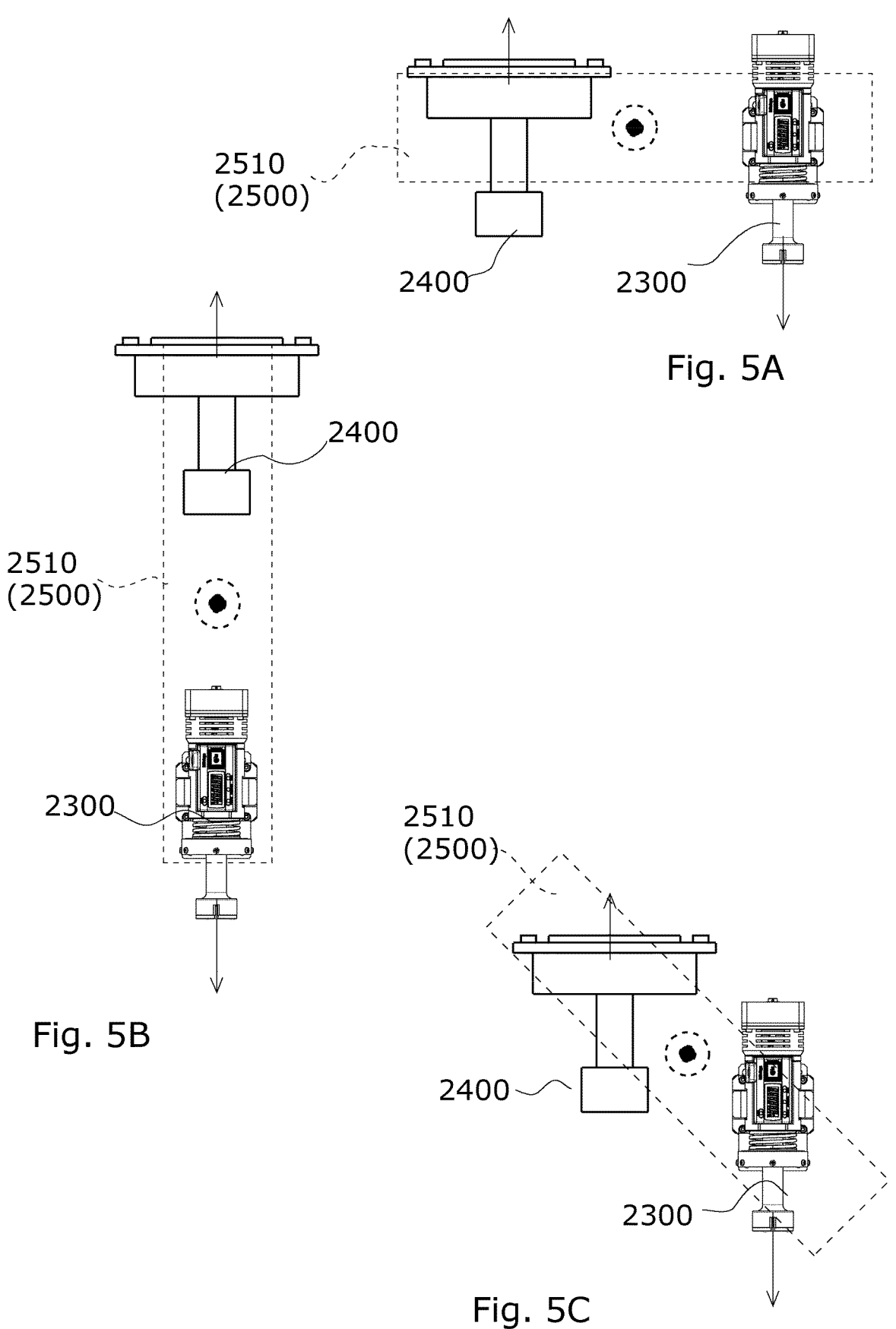
FIGS. 5A to 5C are diagrams for explaining attached postures between the observation camera and an electric inside-diameter measuring unit.

If the observation camera 2400 and the electric inside-diameter measuring unit 2300 are attached so as to be at the same height with respect to the rotary plate 2510 (the pattern in FIG. 5A), in other words, if both the observation camera 2400 and the electric inside-diameter measuring unit 2300 are attached so as to be at right angles with respect to the diameter of the rotation circle (circle of rotation locus) of the rotary plate 2510, the moment of inertia of the exchange means 2500 (the tool unit 2200) can be reduced. However, if the electric inside-diameter measuring unit 2300 and the observation camera 2400 are at the same height, the electric inside-diameter measuring unit 2300 and the observation camera 2400 interfere with each other in imaging/measurement. If the observation camera 2400 and the electric inside-diameter measuring unit 2300 are arranged in such a manner that their axes are on the same straight line with respect to the rotary plate 2510 (the pattern in FIG. 5B), in other words, if both the observation camera 2400 and the electric inside-diameter measuring unit 2300 are parallel to the diameter of the rotation circle of the rotary plate 2510, the observation camera 2400 and the electric inside-diameter measuring unit 2300 do not interfere with each other in imaging/measurement. However, the moment of inertia is large. Considering that the observation camera 2400 and the electric inside-diameter measuring unit 2300 do not interfere with each other and the moment of inertia is reduced, the observation camera 2400 and the electric inside-diameter measuring unit 2300 are attached to the respective columns at the same inclination angle (45° in this case) with respect to the longitudinal direction of the rotary plate 2510 (rotation circle), as in the pattern in FIG. 5C. This angle $\theta$ is $0° < \theta < 90°$ (as expressed in the narrower angle), but $30° \leq \theta \leq 60°$, preferably 45°. The attaching angles of the observation camera 2400 and the electric inside-diameter measuring unit 2300 with respect to the rotary plate 2510 may be different, but it is preferable that the attaching angles are the same inclination angle, taking into consideration the machining and attaching accuracy of the parts, and the accuracy of the movement of the hand part 2130.

In attaching the observation camera 2400 and the electric inside-diameter measuring unit 2300 to the exchange means 2500, it is desirable that the focus position of the observation camera 2400 (the position of an object that can be observed by the camera) and the measurement position of the electric inside-diameter measuring unit 2300 (the position of the object that can be measured by the probe) are at the same position as much as possible when the observation camera 2400 and the electric inside-diameter measuring unit 2300 are exchanged by the exchange means 2500.

For convenience of explanation, as shown in FIG. 1, the posture in which an object is imaged by the observation camera 2400 by rotating the exchange means 2500 in such a manner that the imaging direction Ac of the observation camera 2400 is directly downward (at this time, the measuring head direction At of the electric inside-diameter measuring unit 2300 is directly upward) is referred to as a posture for using the observation camera.

As shown in FIG. 2, the posture in which the electric inside-diameter measuring unit 2300 is oriented to the point to be measured by rotating the exchange means 2500 in such a manner that the measuring head direction At of the electric inside-diameter measuring unit 2300 is directly downward (at this time, the imaging direction Ac of the observation camera 2400 is directly upward) is referred to as a posture for using the measuring sensor tool.

For convenience of explanation, coordinate systems are set for the observation camera 2400 and the electric inside-diameter measuring unit (measuring sensor tool) 2300.

Figure 6:
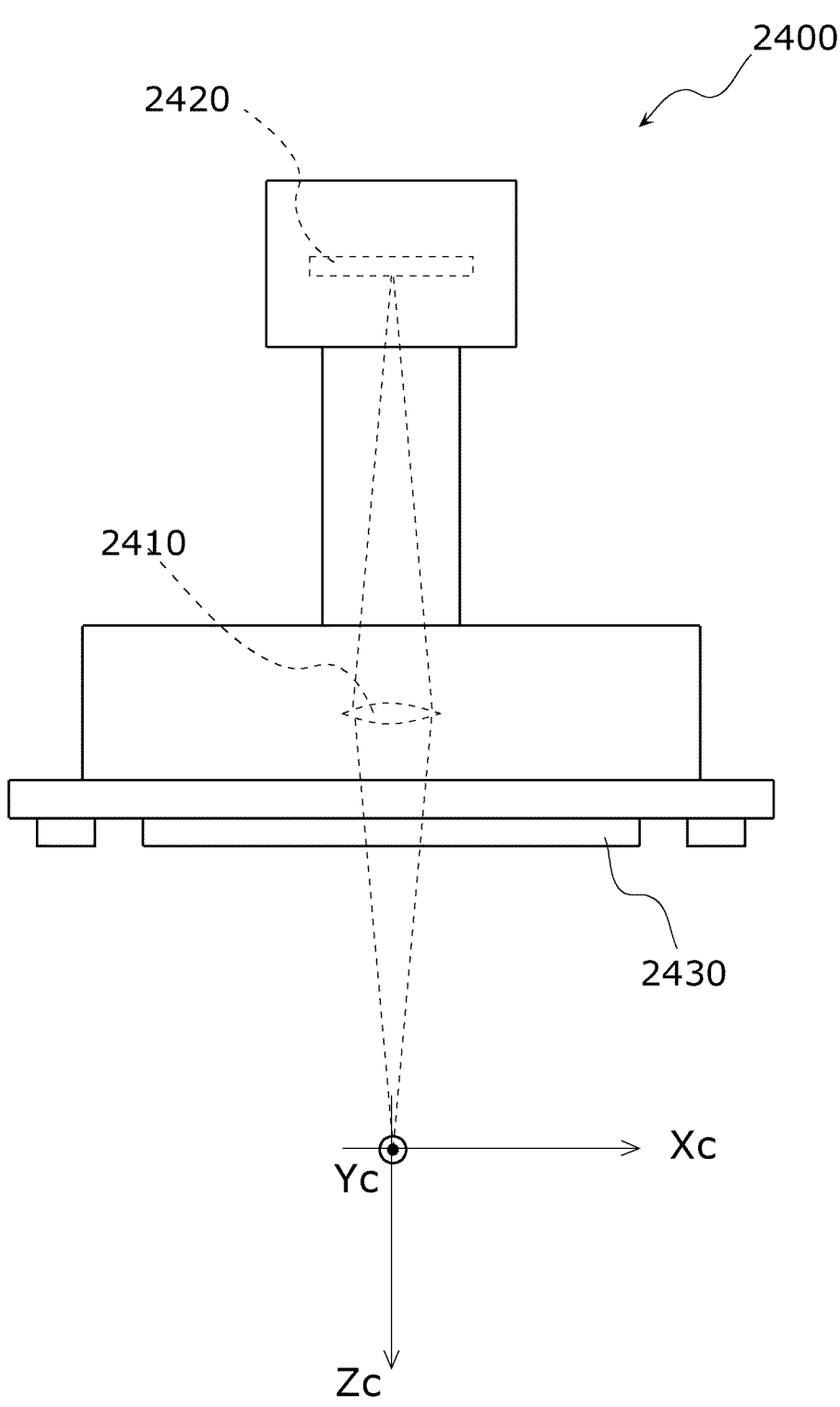
FIG. 6 is a diagram showing an example of a camera coordinate system.

For the observation camera 2400, an axis along the optical axis is referred to as a Zc axis in a camera coordinate system, and the two axes orthogonal to the Zc axis are referred to as an Xc axis and a Yc axis, as shown in the example in FIG. 6.

The direction from the observation camera 2400 toward an object to be observed is the positive direction of the Z axis.

For convenience of clarity in later explanations, the origin of the camera coordinate system is the point of focus on the optical axis (object point).

For convenience of explanation, the offset between the flange coordinate system (robot coordinate system) and the camera coordinate system is represented as Δfc. Here, it is assumed that a design value has been input and set as the offset Δfc between the flange coordinate system (robot coordinate system) and the camera coordinate system. The design offset between the flange coordinate system (robot coordinate system) and the camera coordinate system is calculated based on the design values of the parts of the observation camera 2400 and the exchange means 2500.

Note that, there is a known method for calculating the offset Δfc between the flange coordinate system and the camera coordinate system (the rotation amount in the flange coordinate system to align the position vector from the origin of the flange coordinate system to the origin of the camera coordinate system with the axis of each coordinate system). For example, the tool center point of a camera can be obtained by imaging the same point by the camera while the robot posture is changed in multiple patterns. The offset Δfc between the robot coordinate system and the camera coordinate system (in other words, the tool center point TCP of the observation camera 2400) may be calibrated in advance using this known method, but this is not required.

Figure 7:
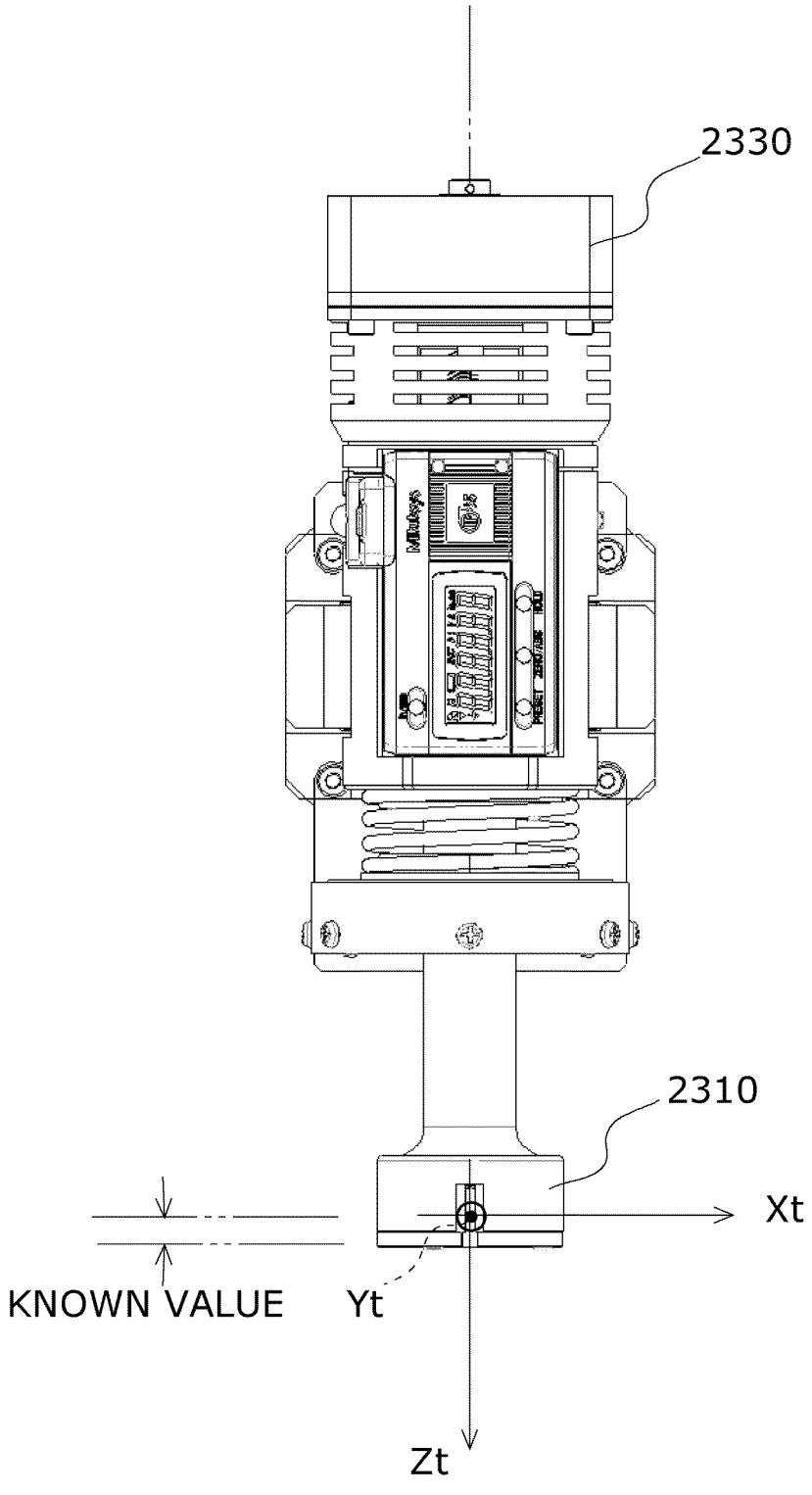
FIG. 7 is a diagram showing an example of a measuring-sensor-tool coordinate system.

For the electric inside-diameter measuring unit 2300, an axis along the centerline of the inside-diameter measuring device is referred to as a Zt axis of a measuring-sensor-tool coordinate system, and the two axes orthogonal to the Zt axis are referred to as an Xt axis and a Yt axis, as shown in the example in FIG. 7. The origin of the measuring-sensor-tool coordinate system is assumed to be positioned a pre-determined distance (a known value is determined) above the bottom surface of the measuring head part 2310 of the inside-diameter measuring device. For convenience of explanation, the offset between the flange coordinate system (robot coordinate system) and the measuring-sensor-tool coordinate system is represented as Δft. Here, the design offset between the flange coordinate system (robot coordinate system) and the measuring-sensor-tool coordinate system has been input and set as a provisional set value. The design offset between the flange coordinate system (robot coordinate system) and the measuring-sensor-tool coordinate system is calculated based on the design values of the parts of the electric inside-diameter measuring unit 2300 and the exchange means 2500. The above provisional set value is calibrated in a calibrating step (ST400), which will be described later.

Figure 8:
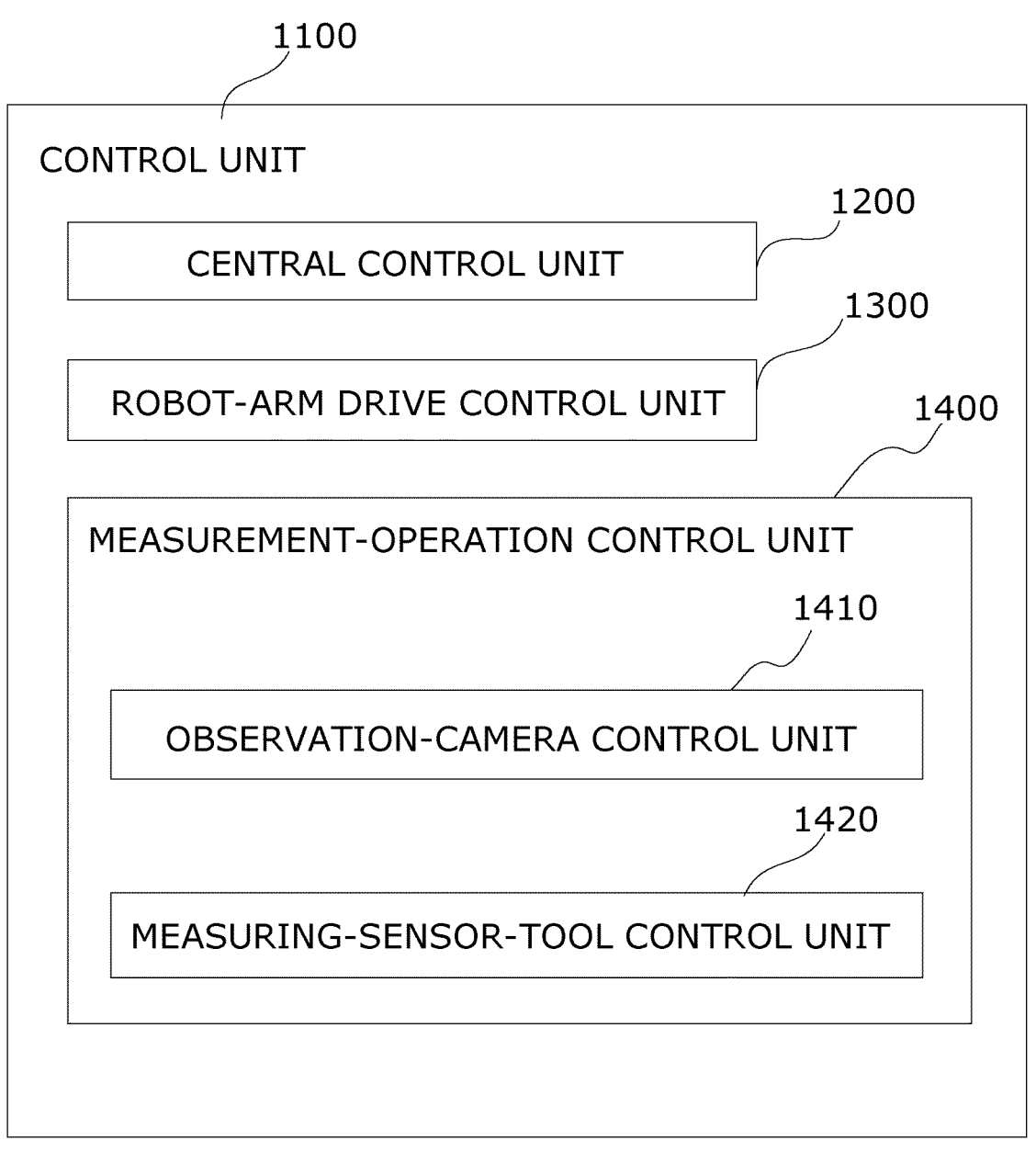
FIG. 8 is a functional block diagram showing a control unit.

FIG. 8 is a functional block diagram showing the control unit 1100.

The control unit 1100 includes a central control unit 1200, a robot-arm drive control unit 1300, and a measurement-operation control unit 1400. The measurement-operation control unit 1400 includes an observation-camera control unit 1410 and a measuring-sensor-tool control unit 1420.

The operation of each control unit is described later with reference to a flowchart.

The control unit 1100 may be implemented by hardware or software incorporated into a computer (a computer terminal including a central processing unit (CPU), a ROM or a RAM storing predetermined programs) that is connected to the measuring-device main body 2000 by wired or wireless communication. An operation control program (measuring part program) is installed in the computer terminal, and the operation of the measuring-device main body 2000 is controlled by executing the program. The method of supplying the program is not limited. The program may be installed by inserting a (nonvolatile) recording medium recording the program directly into the computer, or a reading device that reads the information on the recording medium may be attached externally to the computer to install the program into the computer from the reading device. Alternatively, the program may be supplied to the computer via a communication line, such as the Internet, a LAN cable, or a telephone line, or wirelessly.

(Control Method)

A control method for measuring a dimension (for example, an inside diameter) of a point to be measured by the automatic measuring system 1000 configured in this manner is described below.

Figure 9:
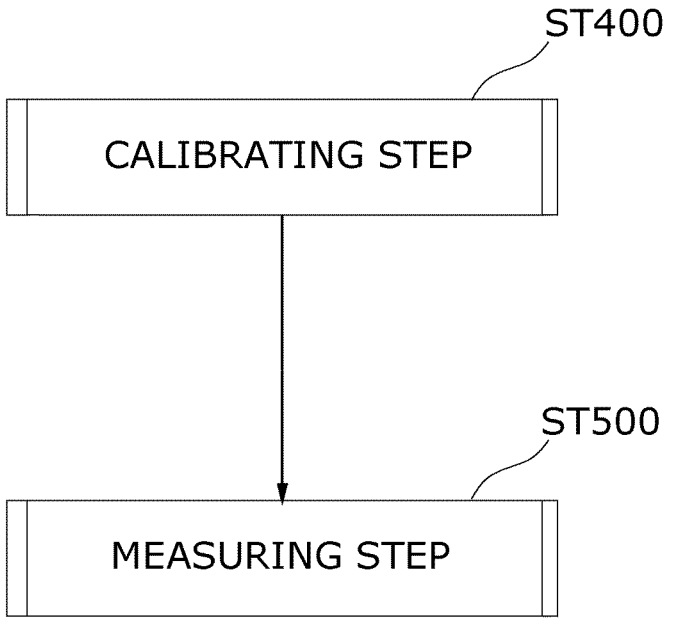
FIG. 9 is an overall flowchart showing an outline of a control method for the automatic measuring system.

FIG. 9 is an overall flowchart showing an outline of the control method for the automatic measuring system 1000.

The control method for measuring a dimension (inside diameter) of a point to be measured by the automatic measuring system 1000 is roughly divided into a calibrating step (ST400) and a measuring step (ST500), as shown in the flowchart in FIG. 9.

(Calibrating Step)

The calibrating step (ST400) is described below.

FIG. 10 is a flowchart for explaining a procedure of the calibrating step (ST400).

First, a calibration master 3000 to be used in calibration is prepared (ST410).

Figure 11:
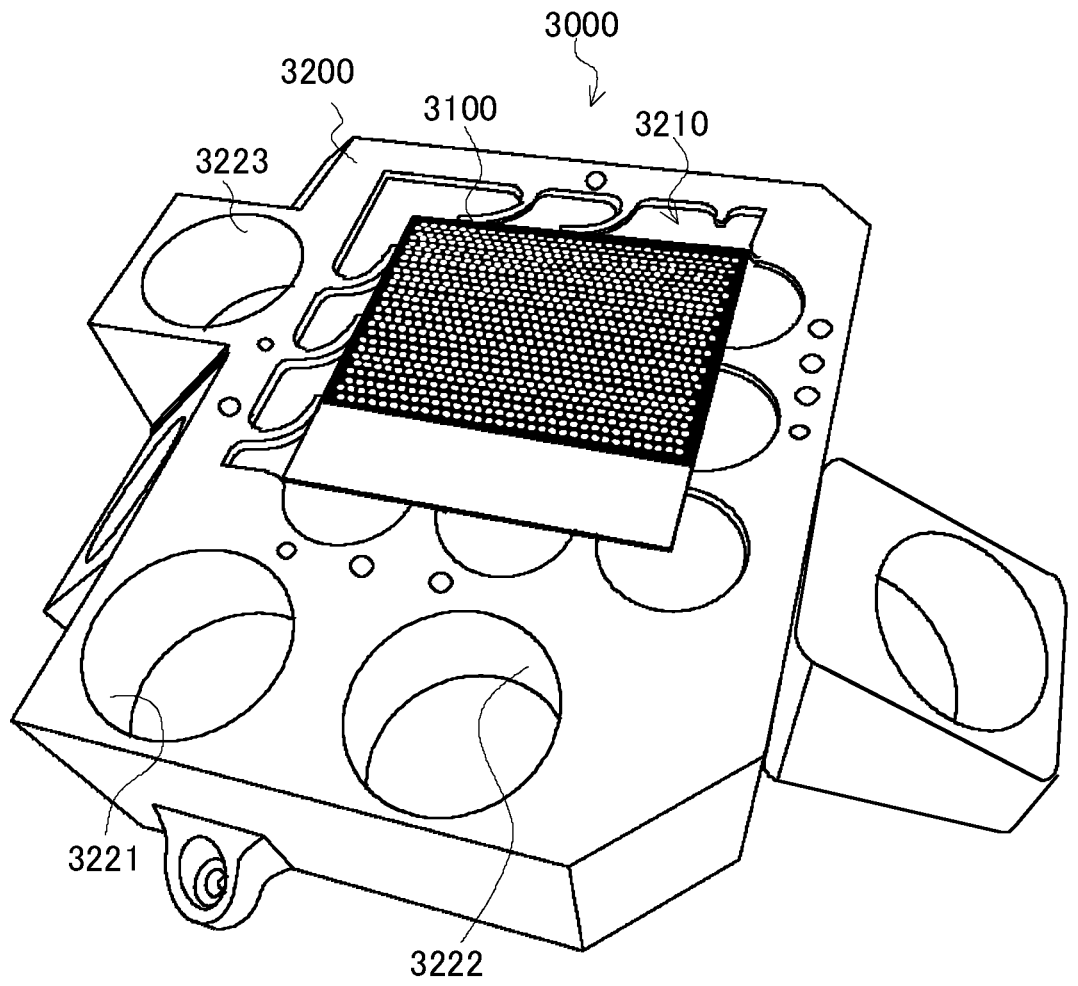
FIG. 11 is an external view of a calibration master.

FIG. 11 is an external view of the calibration master 3000.

The calibration master 3000 is formed by combining a camera calibration chart 3100 with a measuring-sensor-tool calibration jig 3200.

Figure 12:
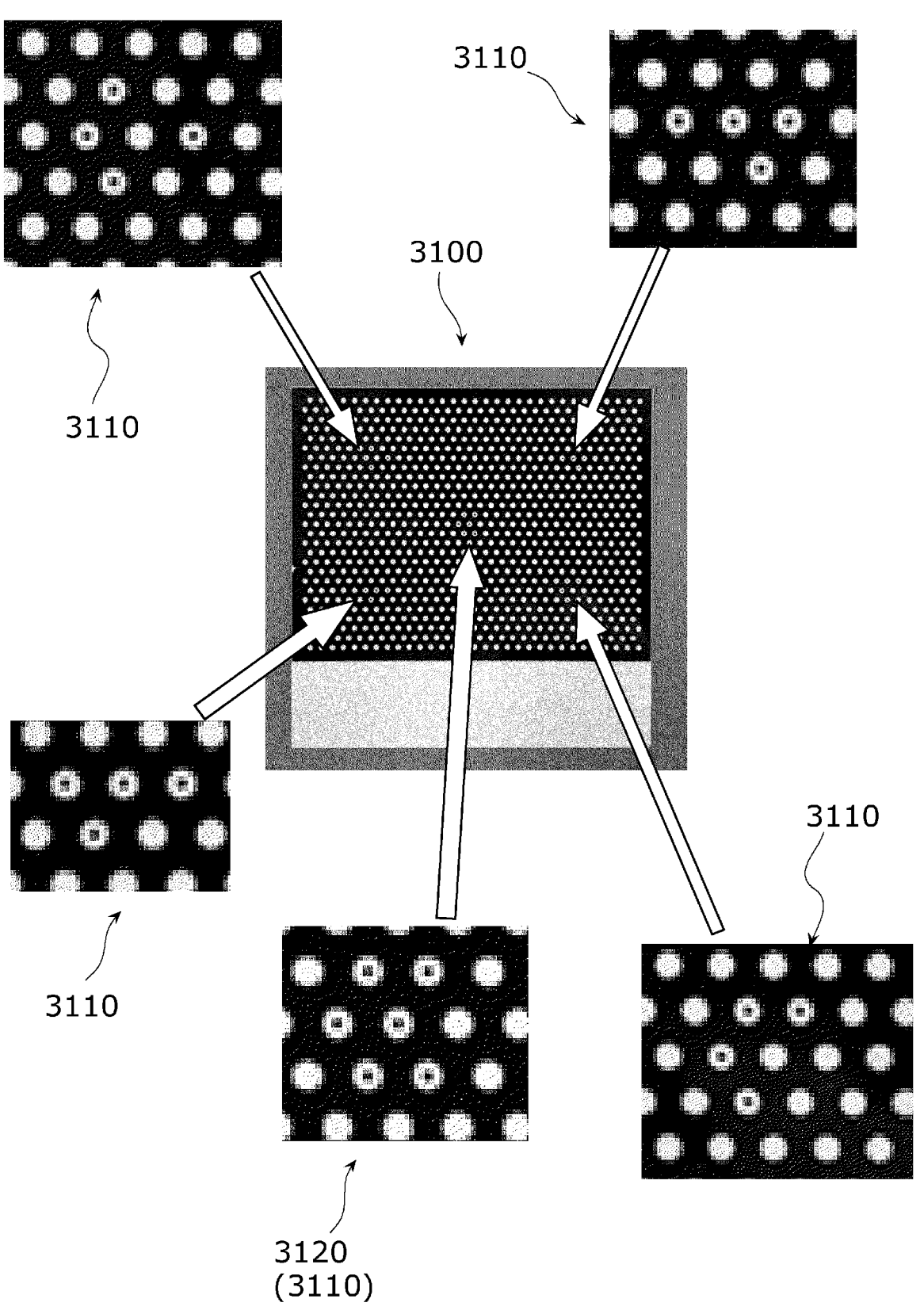
FIG. 12 is a diagram showing a camera calibration chart.

FIG. 12 is a diagram showing the camera calibration chart 3100.

A commercially available calibration plate may be used as the camera calibration chart 3100. For example, a calibration plate 80 mm (Product Id.: 20124) manufactured by MVTec Software GmbH can be used as the camera calibration chart 3100. The camera calibration chart 3100 has a plurality of camera calibration marks 3110 on the surface of a flat, planar plate. Here, the camera calibration marks 3110 are provided at the center point of the camera calibration chart 3100 and at the vertices of the square surrounding the center point. The camera calibration marks 3110 have different dot patterns from each other, and each of the camera calibration marks 3110 can be distinguished and recognized by pattern recognition. The camera calibration mark 3110 at the center point is referred to as a central camera calibration mark 3120.

The measuring-sensor-tool calibration jig 3200 includes a Camera-calibration-chart installation part 3210 for fixedly installing the camera calibration chart 3100 and a plurality of sensor calibration holes 3220 (sensor calibration parts) to be measured by the electric inside-diameter measuring unit 2300. The Camera-calibration-chart installation part 3210 is a recessed part that accepts the camera calibration chart 3100 and presses the camera calibration chart 3100 against the reference edge for positioning by biasing the camera calibration chart 3100 with a springy member. As a result, the camera calibration marks 3110 are fixedly provided at the specified positions with respect to the measuring-sensor-tool calibration jig 3200. In the measuring-sensor-tool calibration jig 3200, three holes that open directly upward as the sensor calibration holes 3220, and two holes that open diagonally are provided. The centerlines of the three sensor calibration holes 3220 that open directly upward are orthogonal to the plane of the camera calibration chart 3100. Here, the three sensor calibration holes 3220 that open directly upward are referred to as a first sensor calibration hole 3221, a second sensor calibration hole 3222, and a third sensor calibration hole 3223.

The relative position between the camera calibration marks 3110 and the sensor calibration holes 3220 is known.

The relative position vector from the central camera calibration mark 3120 to a center P1 of the first sensor calibration hole 3221 is represented as ΔPc1.

The relative position vector from the central camera calibration mark 3120 to a center P2 of the second sensor calibration hole 3222 is represented as ΔPc2.

The relative position vector from the central camera calibration mark 3120 to a center P3 of the third sensor calibration hole 3223 is represented as ΔPc3.

The three sensor calibration holes 3220 that open upward are intended to be used for calibration (the sensor calibration parts), and the two holes that open diagonally are intended to be used for checking whether the calibration has been performed correctly, but the two holes that open diagonally may also be used for calibration.

In the present exemplary embodiment, since the measuring sensor tool is the electric inside-diameter measuring unit 2300, the sensor calibration parts are holes, but the shapes or patterns of the sensor calibration parts differ depending on the type of measuring sensor tool.

The calibration master 3000 is set in the measurable area of the automatic measuring system (for example, on the surface plate or on the rotary table 2010). At this time, the calibration master 3000 is set in such a manner that the camera calibration chart 3100 is horizontal. Alternatively, the camera calibration chart 3100 is parallel to the Xr-Yr plane of the reference coordinate system. (Alternatively, the normal of the camera calibration chart 3100 is in a known orientation in the reference coordinate system.)

Next, the camera calibration marks 3110 are imaged by the observation camera 2400 (ST420). That is, the exchange means 2500 is rotated by rotating the hand part 2130 in such a manner that the imaging direction Ac of the observation camera 2400 is directly downward to make the automatic measuring system 1000 have the posture for using the observation camera. Then, the position and posture of the hand part 2130 are adjusted by driving the articulated robot arm part 2100, and the camera calibration chart 3100 is imaged by the observation camera 2400.

Here, the tool center point of the observation camera 2400 has been input as a design value and is known (the offset Δfc between the flange coordinate system (robot coordinate system) and the camera coordinate system is known), and the robot can be automatically controlled to image the chart by the observation camera 2400.

The posture of the articulated robot arm part 2100 is recorded (ST430). In other words, the origin position of the flange coordinate system and the posture of the flange coordinate system may be recorded. The posture of the articulated robot arm part 2100 at this time is represented as Fc (Fxc, Fyc, Fzc, Fαc, Fβc, Fγc). The central camera calibration mark 3120 can be determined by pattern recognition in the image data, and therefore the position Cc (Cx, Cy, Cz) of the central camera calibration mark 3120 in the camera coordinate system is obtained.

Therefore, the coordinates Pc of the central camera calibration mark 3120 are expressed as follows:

$$Pc = Fc + \Delta fc + Cc.$$

Now, Cc is a point on the camera coordinate system, and Fc is a point on the reference coordinate system. The above expression does not represent a mathematically (or quantitatively) rigorous arithmetic equation, but a conceptually (or qualitatively) simplified representation of the elemental components of information for ease of explanation. Rewriting the expression into a quantitative arithmetic equation by taking into account the transformation between the reference coordinate system and the flange coordinate system, the transformation between the flange coordinate system and the camera coordinate system, or the like can be done by mathematical manipulation. The following expressions should be interpreted in a similar manner.

From the above, the center P1 of the first sensor calibration hole 3221 is expressed as follows:

$$P1 = Pc + \Delta Pc1 = Fc + \Delta fc + Cc + \Delta Pc1.$$

Similarly, the center P2 of the second sensor calibration hole 3222 is expressed as follows:

$$P2 = Pc + \Delta Pc2 = Fc + \Delta fc + Cc + \Delta Pc2.$$

The center P3 of the third sensor calibration hole 3223 is expressed as follows:

$$P3 = Pc + \Delta Pc2 = Fc + \Delta fc + Cc + \Delta Pc3.$$

Next, one of the sensor calibration holes 3220 is measured by the electric inside-diameter measuring unit 2300 (ST440). That is, the exchange means 2500 is rotated by rotating the hand part 2130 in such a manner that the measuring head direction of the electric inside-diameter measuring unit 2300 is directly downward to make the automatic measuring system 1000 have the posture for using the measuring sensor tool. Then, the measuring head part 2310 of the electric inside-diameter measuring unit 2300 is inserted into the sensor calibration hole 3220 to measure the sensor calibration hole 3220.

Now, the offset between the flange coordinate system (robot coordinate system) and the measuring-sensor-tool coordinate system is assumed to have been input and set as the design value. Therefore, it is possible to move the electric inside-diameter measuring unit 2300 almost directly above the sensor calibration hole 3220 by automatic control of the robot arm part 2100. Then, the operation to insert the measuring head part 2310 of the electric inside-diameter measuring unit 2300 into the sensor calibration hole 3220 is performed manually. Once the measuring head part 2310 is inserted in the sensor calibration hole 3220, three of the probe 2320 are moved forward to the inner wall of the hole by an automatic motor drive. The probe 2320 are brought into contact with the inner wall of the hole at the same contact pressure. At this time, the centerline of the electric inside-diameter measuring unit 2300 is aligned with the centerline of the hole, and the measuring head part 2310 is at the center of the hole.

Note that the inner diameter measurement operation may be performed using the electric inner diameter measuring unit 2300, but the inner diameter of the sensor calibration hole 3220 is not the target to be acquired, but the position of the sensor calibration hole 3220 is to be acquired. Therefore, the value of the inner diameter of the sensor calibration hole 3220 does not need to be obtained.

It would be sufficient to obtain the position of the hole in the measurement sensor tool coordinate system (for example, the coordinates of the center of the hole), but assuming that the electric inner diameter measuring unit 2300 is aligned with the center line of the hole, the obtained value of the position of the hole (for example, the coordinates of the center of the hole) in the measurement sensor tool coordinate system may be set to (0, 0, 0).

Further, in order to align the electric inner diameter measuring unit 2300 as much as possible to the center of the sensor calibration hole 3220, the electric inner diameter measuring unit 2300 may perform an inner diameter measuring operation (advancing the three probes) as described above. However, manual alignment is also sufficient.

This is because a minute displacement of the electric inner diameter measuring unit 2300 in the sensor calibration hole 3220 does not significantly affect the position and posture of the hand part 2130 of the articulated robot arm part 2100.

Now, the first sensor calibration hole 3221 is assumed to have been measured. In this state, the posture of the articulated robot arm part 2100 is recorded. In other words, the origin position of the flange coordinate system and the posture of the flange coordinate system may be recorded. The posture of the articulated robot arm part 2100 at this time is represented as F1 (Fx1, Fy1, Fz1, F$\alpha$1, F$\beta$1, F$\gamma$1). The coordinates of the center of the hole in the measuring-sensor-tool coordinate system are Pt1 (0, 0, 0).

From the above, the center P1 of the first sensor calibration hole 3221 is expressed as follows:

$$P1 = F1 + \Delta ft + Pt1.$$

$$(Pt1 \text{ is zero, and } P1 = F1 + \Delta ft)$$

Similarly, the second sensor calibration hole 3222 and the third sensor calibration hole 3223 are measured by the electric inside-diameter measuring unit 2300.

The center P2 of the second sensor calibration hole 3222 is expressed as follows:

$$P2 = F2 + \Delta ft + Pt2.$$

$$(Pt2 \text{ is zero, and } P2 = F2 + \Delta ft)$$

The center P3 of the third sensor calibration hole 3223 is expressed as follows:

$$P3 = F3 + \Delta ft + Pt3.$$

$$(Pt3 \text{ is zero, and } P3 = F3 + \Delta ft)$$

By contrasting the data obtained by imaging the central camera calibration mark 3120 by the observation camera 2400 with the data obtained by measuring the sensor calibration holes 3220 acquired by the electric inside-diameter measuring unit 2300, the offset $\Delta tc$ between the camera coordinate system and the measuring-sensor-tool coordinate system is calculated (ST460).

$$P1 = F1 + \Delta ft$$

$$P1 = Pc + \Delta Pc1 = Fc + \Delta fc + Cc + \Delta Pc1$$

From these two expressions, the following expression holds:

$$\Delta tc = \Delta ft - \Delta fc = Fc + Cc + \Delta Pc1 - F1.$$

Fc+Cc+$\Delta$Pc1−F1 is a known value.

$$Fc + Cc + \Delta Pc1 - F1 = Fc\,(Fxc, Fyc, Fzc, F\alpha c, F\beta c, F\gamma c) +$$
$$Cc + \Delta Pc1 - F1\,(Fx1, Fy1, Fz1, F\alpha 1, F\beta 1, F\gamma 1)$$

Therefore, the offset $\Delta tc$ ($\Delta tcx$, $\Delta tcy$, $\Delta tcz$, $\Delta tc\alpha$, $\Delta tc\beta$, $\Delta tc\gamma$) between the camera coordinate system and the measuring-sensor-tool coordinate system is obtained. Then, the tool center point of the measuring sensor tool (electric inside-diameter measuring unit 2300) using the observation camera 2400 as a reference is calculated (ST470) as follows:

$$\Delta ft = \Delta fc - \Delta tc = \Delta fc - (Fc + Cc + \Delta Pc1 - F1).$$

Now, $\Delta fc$ is a known value because the design value has been input and set as the offset $\Delta fc$ between the flange coordinate system (robot coordinate system) and the camera coordinate system. In this manner, the tool center point of the measuring sensor tool (electric inside-diameter measuring unit 2300) using the observation camera 2400 as the reference is obtained.

The following is a supplement to the above solution.

Since the lens of the observation camera 2400 is a standard lens, the inclination of the observation camera 2400 can also be obtained from the image data of the camera calibration chart 3100. Therefore, the center coordinate values and orientations (inclinations) of the first sensor calibration hole 3221, the second sensor calibration hole 3222, the third sensor calibration hole 3223, and so on can be obtained from the image data obtained from the observation by the observation camera 2400. These are represented as (P1, $\theta$1, P2, $\theta$2, P3, $\theta$3, . . . ), in which P is a set of (x, y, z) representing a point in space, and $\theta$ is a set of ($\alpha$, $\beta$, $\gamma$) representing inclination (rotation around x axis, rotation around y axis, rotation around z axis. Similarly, the coordinate values and inclinations of the first sensor calibration hole 3221, the second sensor calibration hole 3222, the third sensor calibration hole 3223, and so on, obtained by the measurement by the electric inside-diameter measuring unit 2300 are represented as (P1', $\theta$1', P2', $\theta$2', P3', $\theta$3', . . . ).

The matrix representing the offset $\Delta tc$ between the camera coordinate system and the measuring-sensor-tool coordinate system is represented as M.

At this time, the following expression holds:

$$[(P1 \propto \theta, \theta 1 \propto \theta, P2 \propto \theta, \theta 2 \propto \theta, P3 \propto \theta, \theta 3 \propto \theta, \dots)] = M$$
$$[(P1, \theta 1, P2, \theta 2, P3, \theta 3, \dots)].$$

Here, a square bracket [ ] is interpreted as a row vector or column vector obtained by rearranging a parenthesis ( ) appropriately.

From this simultaneous equation, the matrix M representing the offset $\Delta tc$ between the camera coordinate system and the measuring-sensor-tool coordinate system can be calculated. Since six expressions are needed to calculate six unknowns, the number of calibration holes in the calibration master 3000 may be increased to six, or multiple (for example, two) calibration masters 3000 may be used, for example. In addition, steps ST420 to ST450 may be repeated multiple times (for example, twice) for the same single calibration master 3000, while the position and posture are changed as appropriate to obtain a set of data for calibration. Alternatively, from the point of view of reducing the number of unknowns to be calculated, only the origin deviation ($\Delta x$, $\Delta y$, $\Delta z$) may selected for calibration, on the assumption that, for example, there is no axis inclination between the camera coordinate system and the measuring-sensor-tool coordinate system (that the corresponding axes in the camera coordinate system and the measuring-sensor-tool coordinate system are parallel to each other). Furthermore, on the assumption that the Z axes are parallel to each other, $\Delta x$, $\Delta y$, and the rotation ($\gamma$) in the x-y plane may be calibrated.

In the present exemplary embodiment, as long as the hand part 2130 of the arm part 2120 can be controlled in such a manner that the measuring head part 2310 of the electric inside-diameter measuring unit 2300 is inserted into a hole to be measured, the position and posture of the electric inside-diameter measuring unit 2300 are adjusted autonomously in such a manner that the axis of the electric inside-diameter measuring unit 2300 is aligned with the centerline of the hole by the automatic forward/backward movement of the probe 2320 by the drive of the motor 2330. Then, the probe 2320 are brought into even contact with the inner wall of the hole to acquire a measurement value of the hole diameter.

In this exemplary embodiment, the electric inner diameter measuring unit 2300 has a joint part (floating joint) that can allow translation and rotation relative to the hand part 2130 of the articulated robot arm part 2100. If the electric inner diameter measurement unit 2300 is moved to the measurement target (inside the hole in this case) by the hand section 2130 of the multi-joint robot arm section 2100, even if the hand part 2130 of the articulated robot arm part 2100 do not move any further, the position and orientation of the electric inner diameter measuring unit 2300 are autonomously adjusted so that the axis of the electric inner diameter measuring unit 2300 is aligned with the center line of the hole.

(Measuring Step ST500)

Figure 13:
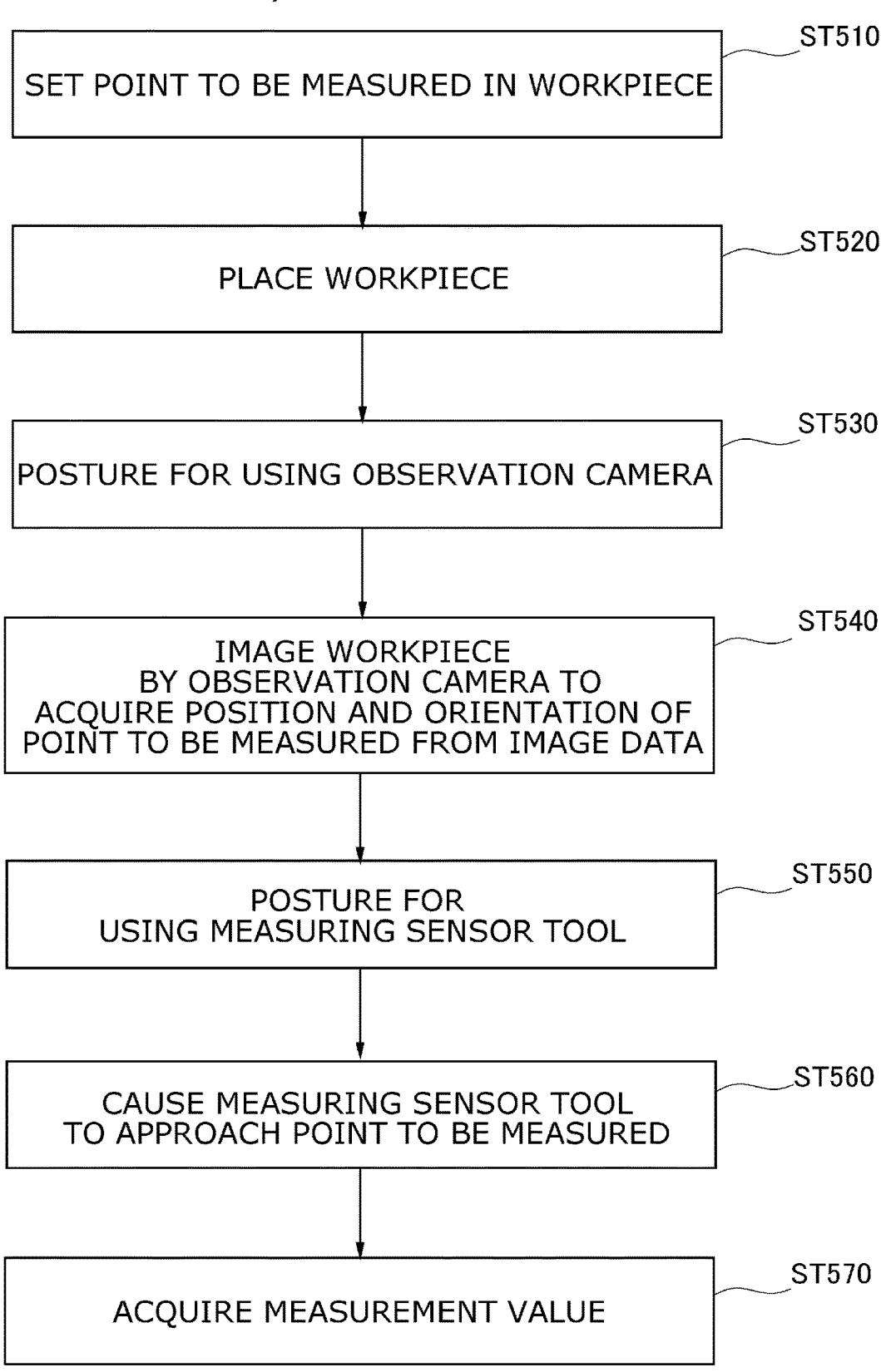
FIG. 13 is a flowchart for explaining a procedure of a measuring step.

FIG. 13 is a flowchart for explaining a procedure of the measuring step ST500.

A point to be measured (for example, a hole) whose dimension (for example, an inside diameter) is to be measured in a workpiece, which is an object to be measured, is set in the control unit 1100 (ST510).

For example, based on the set value data (CAD data) of the workpiece, the point to be measured is set and registered in the control unit 1100.

The object to be measured is placed in the measurable area (for example, on the surface plate or on the rotary table 2010) of the automatic measuring system 1000 (ST520).

The exchange means 2500 is rotated by rotating the hand part 2130 to make the automatic measuring system 1000 have the posture for using the observation camera (ST530). The workpiece is imaged by the observation camera 2400 to acquire the position and orientation (posture) of the point to be measured from the image data (ST540).

Next, the exchange means 2500 is rotated by rotating the hand part 2130 to make the automatic measuring system 1000 have the posture for using the measuring sensor tool (ST550).

The electric inside-diameter measuring unit 2300 is caused to approach the point to be measured (ST560). The measuring head part 2310 of the electric inside-diameter measuring unit 2300 is inserted into the point to be measured (hole) by automatic control of the articulated robot arm part 2100, using the tool center point (TCP) of the electric inside-diameter measuring unit 2300 calculated from the previous calibration.

When the measuring head part 2310 of the electric inside-diameter measuring unit 2300 is inserted in the point to be measured (hole), the movement of the arm part 2120 is stopped to measure the inside diameter by the electric inside-diameter measuring unit 2300 (ST570). The probe 2320 are moved forward by the automatic motor drive of the electric inside-diameter measuring unit 2300 to be brought into contact with the inner wall of the hole and to acquire a measurement of the hole diameter.

In this manner, the measurement of one point to be measured (hole diameter) in one workpiece is completed.

Steps ST530 to ST570 are repeated to sequentially measure the registered points to be measured in the workpiece. By further repeating the measuring step (ST500) while the workpiece is replaced, unmanned automatic measurement is performed.

As described above, with the present exemplary embodiment, it is possible to automatically perform measurement of a dimension or shape using a measuring device.

In particular, it is possible for a robot to automatically perform measurement of a dimension or shape in which an accurate approach of a contact-type measuring device is required, such as inserting the measuring device into a hole.

Even if a measuring tool in which its head is large or the contact between its probe 2320 and an object to be measured is a line or plane, such as an inside-diameter measuring device, is desired to be used for automatic measurement, it is difficult to calculate the tool center point (TCP) accurately and directly for such a measuring tool. In this regard, in the present exemplary embodiment, the observation camera 2400 is provided to be used interchangeably in position with the measuring sensor tool, and it is possible to calculate the tool center point of the measuring sensor tool (electric inside-diameter measuring unit 2300) using the observation camera 2400 as the reference.

After the object to be measured (point) is imaged by the observation camera 2400, in other words, after the object is image-recognized by the observation camera 2400, the position of the observation camera 2400 is exchanged for the position of the electric inside-diameter measuring unit 2300, and then the tool center point of the measuring sensor tool (electric inside-diameter measuring unit 2300) is used to cause the measuring sensor tool (electric inside-diameter measuring unit 2300) to approach the point to be measured, whereby the measuring head part 2310 of the electric inside-diameter measuring unit 2300 is inserted into the point to be measured (hole).

Although the articulated robot arm part 2100 has motion performance errors for each product, and the exchange means 2500, the observation camera 2400, and the measuring sensor tool (electric inside-diameter measuring unit 2300) also have individual differences for each product, the tool center point of the measuring sensor tool (electric inside-diameter measuring unit 2300) using the observation camera 2400 as the reference calibrated by the calibration method in the present exemplary embodiment is obtained as a calibrated value by absorbing all accumulated errors in the actual device. Therefore, with the present exemplary embodiment, it is possible to accurately control the measuring sensor tool to a target (point to be measured) imaged by the observation camera 2400, regardless of differences in motion performance or individual differences for each product.

The exchange between the observation camera 2400 and the electric inside-diameter measuring unit 2300 (measuring sensor tool) is performed by simply rotating (180°) the hand part 2130 (J6 axis). Therefore, the error (misalignment in position or posture) in each movement is extremely small, compared to exchange by a complicated mechanism. Since the observation camera 2400 is exchanged for the measuring sensor tool by the exchange means 2500, the observation camera 2400 can be brought close enough to the target, and image the object from directly above while the target is brightly illuminated by the ring illumination 2430. Therefore, the observation camera 2400 can image an object to be measured (point) accurately. After the object to be measured (point) is imaged by the observation camera 2400, the position of the electric inside-diameter measuring unit 2300 is exchanged for the position of the observation camera 2400 to cause the electric inside-diameter measuring unit 2300 to approach the object to be measured (point). That is, the drive amount of the articulated robot arm part 2100 required to cause the electric inside-diameter measuring unit 2300 to approach the object to be measured (point) after the object to be measured (point) is imaged by the observation camera 2400 is the smallest conceivable amount. This makes the control error in each movement extremely small. With the automatic measuring system 1000 in the present exemplary embodiment, it is possible to accurately control the measuring sensor tool to a desired point to be measured, and to minimize accidents such as unintentional collision between the measuring sensor tool and the workpiece.

(First Modification)

There is a known method for calculating the offset Δfc between the flange coordinate system and the camera coordinate system (the rotation amount in the flange coordinate system to align the position vector from the origin of the flange coordinate system to the origin of the camera coordinate system with the axis of each coordinate system). For example, the tool center point of a camera can be obtained by imaging the same point by the camera while the robot posture is changed in multiple patterns. The offset Δfc between the robot coordinate system and the camera coordinate system (in other words, the tool center point (TCP) of the observation camera 2400) may be calibrated using this known method.

Second Exemplary Embodiment

A second exemplary embodiment of the present invention is described below.

The second exemplary embodiment describes a non-contact image measuring device 4000 as a measuring sensor tool, instead of the electric inside-diameter measuring unit 2300 in the first exemplary embodiment.

Figure 14:
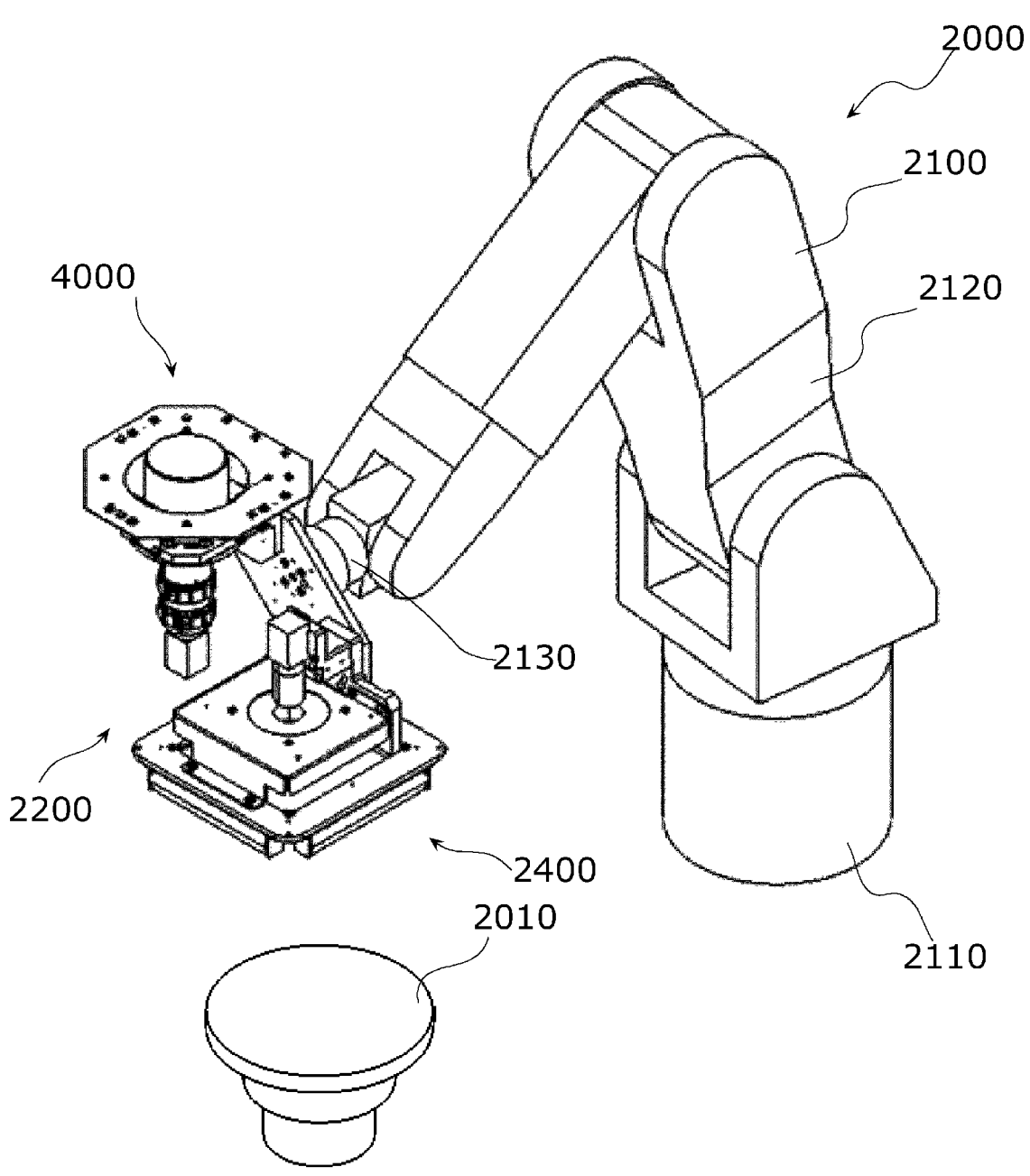
FIG. 14 is an overall external view of an automatic measuring system (in a posture for using an observation camera) in a second exemplary embodiment.
Figure 15:
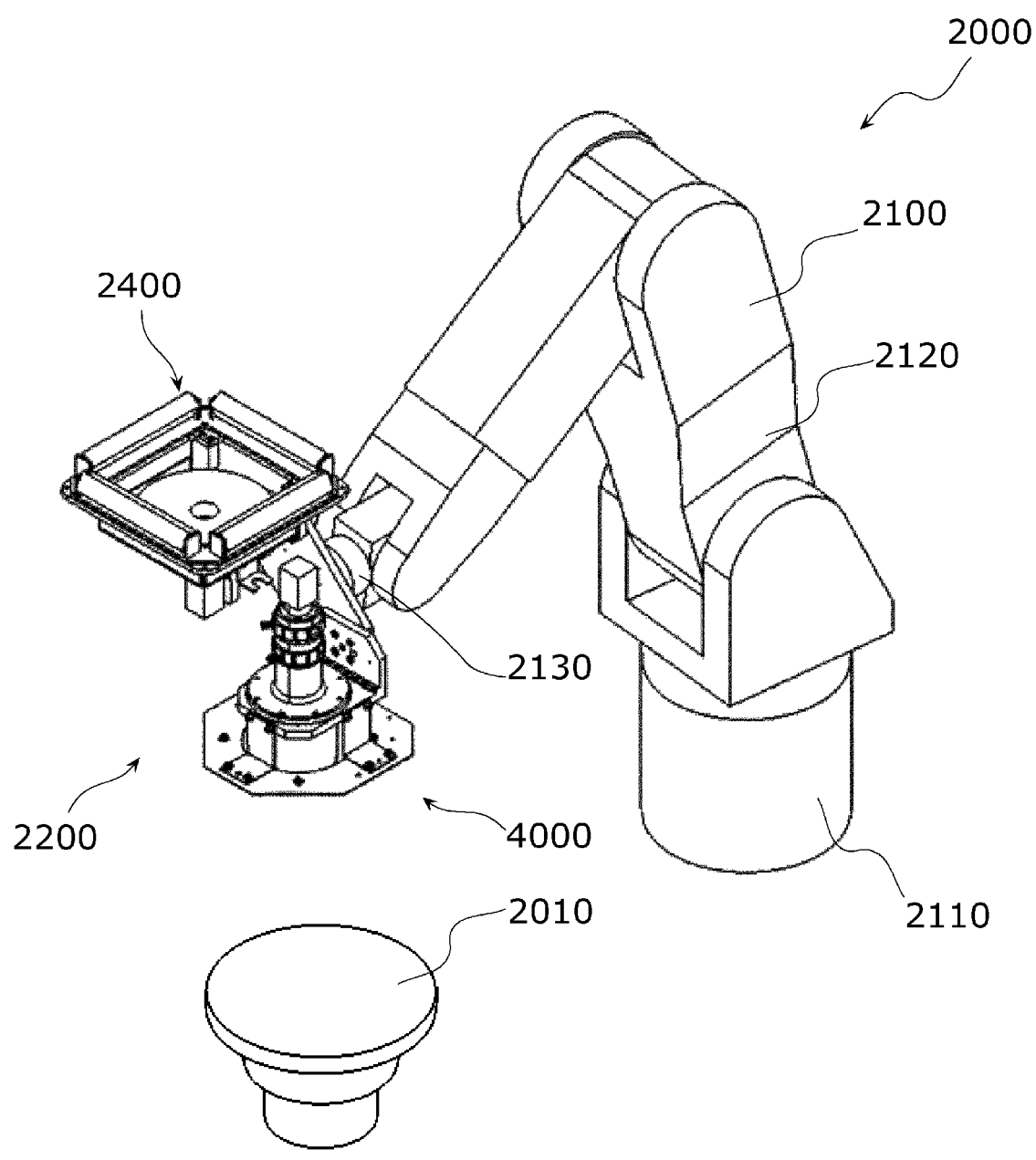
FIG. 15 is an overall external view of the automatic measuring system (in a posture for using a measuring sensor tool) in the second exemplary embodiment.

FIGS. 14 and 15 are overall views of an automatic measuring system 1000 in the second exemplary embodiment.

In the second exemplary embodiment, the measuring sensor tool is a non-contact measuring tool, which the image measuring device 4000 in this case. The image measuring device 4000 includes a telecentric lens system. Since a telecentric lens system is included, there is no distortion caused by the angle of view, and an accurate dimension of an object to be measured can be obtained from image data. For the image measuring device 4000, as shown in the example in FIG. 16, the axis along the optical axis is referred to as a Zt axis of the measuring-sensor-tool coordinate system, and the two axes orthogonal to the Zt axis are referred to as an Xt axis and a Yt axis.

Figure 16:
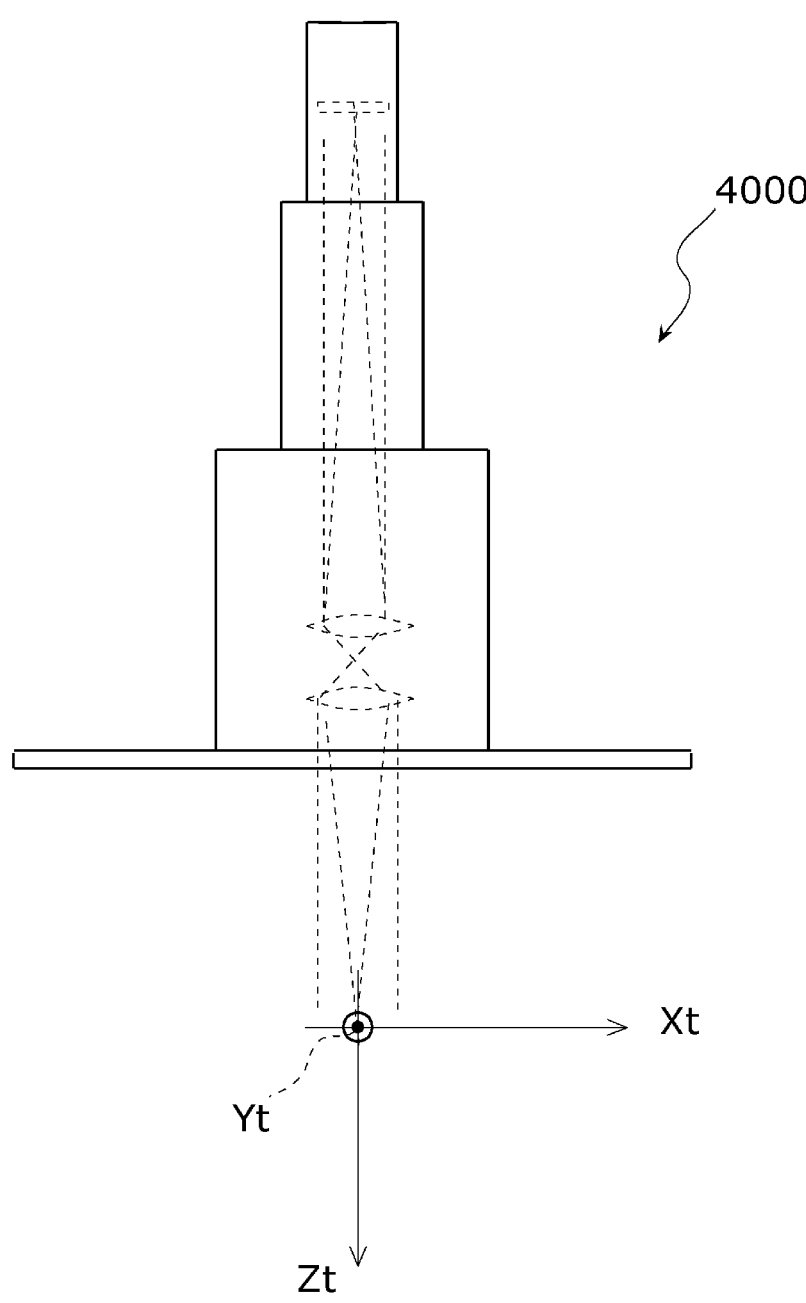
FIG. 16 is a diagram showing an example of a measuring-sensor-tool coordinate system of an image measuring device.

FIG. 16 is a diagram showing an example of the measuring-sensor-tool coordinate system for the image measuring device 4000.

The origin of the measuring-sensor-tool coordinate system is assumed to be within the range of focus (within the depth of field) on the optical axis of the image measuring device 4000. Regarding the offset between the flange coordinate system (robot coordinate system) and the measuring-sensor-tool coordinate system, a design value has been input and set as a provisional set value. The offset between the flange coordinate system (robot coordinate system) and the measuring-sensor-tool coordinate system is represented as Δft.

The configuration of the exchange means 2500 is similar to that described in the first exemplary embodiment, but the observation camera 2400 and the image measuring device 4000 are attached to the exchange means 2500 in such a manner that the plane of focus is on the same plane when the positions are exchanged.

The calibrating step of the automatic measuring system 1000 in the second exemplary embodiment is described below.

Figure 17:
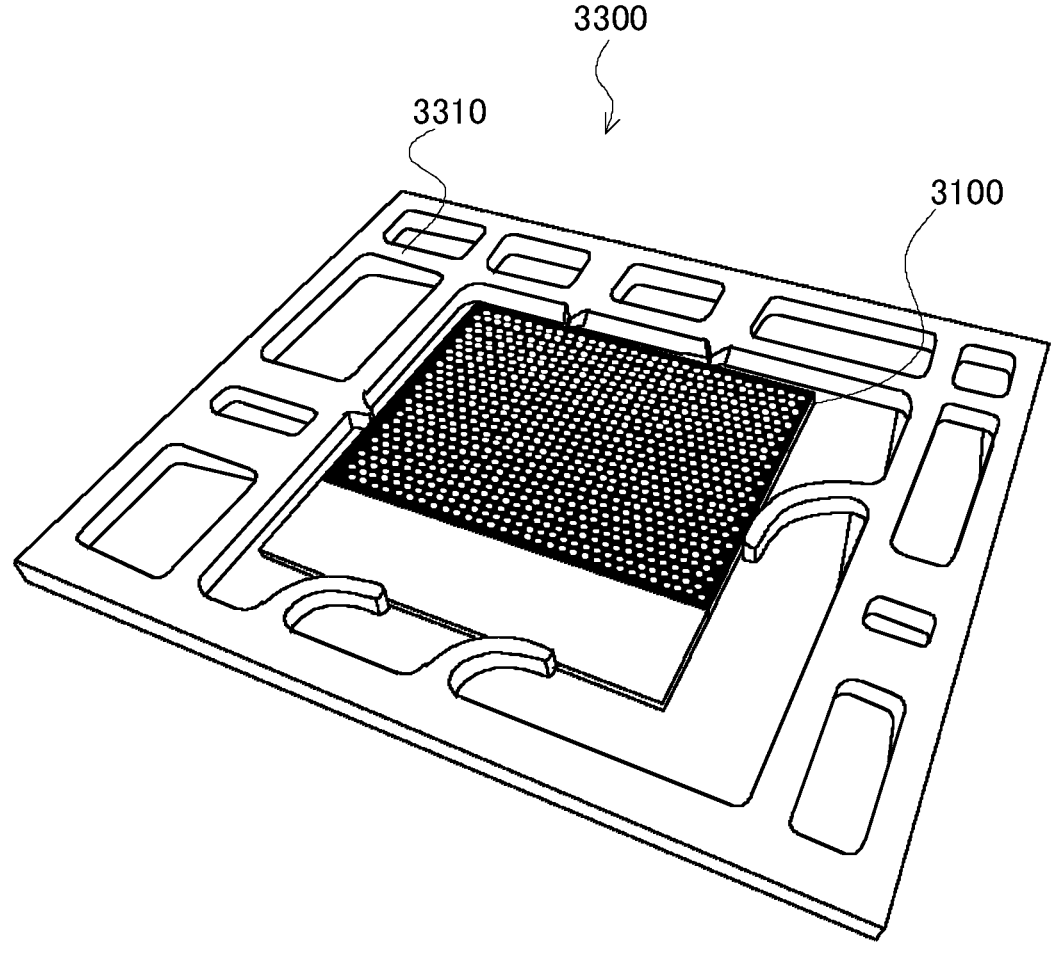
FIG. 17 is a view of a calibration master to be used to calibrate the automatic measuring system in the second exemplary embodiment.

FIG. 17 is a diagram showing a calibration master 3300 used to calibrate the automatic measuring system 1000 in the second exemplary embodiment.

To calibrate the automatic measuring system 1000 in the second exemplary embodiment, the camera calibration chart 3100 used in the first embodiment is used. The camera calibration marks 3110 attached to one camera calibration chart 3100 serve as the sensor calibration parts. In FIG. 17, a camera-calibration-chart installation frame 3310 presses the camera calibration chart 3100 against the reference edge for positioning by biasing the camera calibration chart 3100 with a springy member.

The calibrating step in the second exemplary embodiment is described with reference to the flowchart in FIG. 18.

FIG. 18 is a flowchart for explaining a procedure of the calibrating step in the second exemplary embodiment.

The calibration master 3300 is prepared and set in the measurable area (for example, on the surface plate or the rotary table 2010) of the automatic measuring system 1000 (ST610). At this time, the calibration master 3300 is set in such a manner that the camera calibration chart 3100 is horizontal. Alternatively, the camera calibration chart 3100 is parallel to the XY plane of the reference coordinate system. (Alternatively, the normal of the camera calibration chart 3100 is in a known orientation in the reference coordinate system.)

Next, the camera calibration marks 3110 are imaged by the observation camera 2400 (ST620). That is, the exchange means 2500 is rotated by rotating the hand part 2130 in such a manner that the imaging direction Ac of the observation camera 2400 is directly downward to make the automatic measuring system 1000 have the posture for using the observation camera. Then, the camera calibration chart 3100 is imaged by the observation camera 2400. The posture Fc (Fxc, Fyc, Fzc, Fαc, Fβc, Fγc) of the articulated robot arm part 2100 at this time is recorded (ST630).

The coordinates Pc of the central camera calibration mark 3120 in the robot coordinate system are as follows:

$$Pc = Fc + \Delta fc + Cc.$$

Next, the exchange means 2500 is rotated by rotating the hand part 2130, the automatic measuring system 1000 is made to have the posture for using the measuring sensor tool, and the camera calibration marks 3110 are imaged by the image measuring device 4000 (ST640).

At this time, the image measuring device 4000 is moved to a position where the camera calibration marks 3110 can be imaged. By imaging the five camera calibration marks 3110, the coordinate value Tc of the central camera calibration mark 3120 can be obtained.

In this state, the posture of the articulated robot arm part 2100 is recorded (ST650). The posture of the articulated robot arm part 2100 at this time is represented as F1 (Fx1, Fy1, Fz1, Fα1, Fβ1, Fγ1).

The coordinates Pc of the central camera calibration mark 3120 in the robot coordinate system are as follows:

$$Pc = F1 + \Delta\mathit{ft} + Tc.$$

By contrasting the data obtained by imaging the central camera calibration mark 3120 by the observation camera 2400 with the data obtained by imaging the central camera calibration mark 3120 by the image measuring device 4000, the offset Δtc between the camera coordinate system and the measuring-sensor-tool coordinate system is calculated (ST660).

$$Pc = Fc + \Delta\mathit{fc} + Cc$$
$$Pc = F1 + \Delta\mathit{ft} + Tc$$

From these two equations, the following expression holds:

$$\Delta tc = \Delta\mathit{ft} - \Delta\mathit{fc} = Fc + Cc - F1 - Tc$$

Fc+Cc−F1−Tc is a known value.

$$Fc + Cc - F1 - Tc = Fc(Fxc, Fyc, Fzc, F\alpha c, F\beta c, F\gamma c) +$$
$$Cc - F1(Fx1, Fy1, Fz1, F\alpha 1, F\beta 1, F\gamma 1) - Tc$$

Therefore, the offset Δtc (Δtcx, Δtcy, Δtcz, Δtcα, Δtcβ, Δtcγ) between the camera coordinate system and the measuring-sensor-tool coordinate system is obtained.

Then, the tool center point of the measuring sensor tool (image measuring device 4000) using the observation camera 2400 as the reference can be calculated (ST670).

$$\Delta\mathit{ft} = \Delta\mathit{fc} - \Delta tc = \Delta\mathit{fc} - (Fc + Cc - F1 - Tc)$$

Now, Δfc is a known value because the design value has been input and set as the offset Δfc between the flange coordinate system (robot coordinate system) and the camera coordinate system. In this manner, the tool center point of the measuring sensor tool (image measuring device 4000) using the observation camera 2400 as the reference is obtained.

In measuring the dimension or shape of the object to be measured by the image measuring device 4000, after the object is imaged by the observation camera 2400, in other words, after the object is image-recognized by the observation camera 2400, the position of the observation camera 2400 is exchanged for the position of the image measuring device 4000, and then the previously calibrated tool center point of the measuring sensor tool (image measuring device 4000) is used to cause the measuring sensor tool (image measuring device 4000) to approach the object to be measured to measure the object. With this method, the image measuring device 4000 accurately images the object to be measured (point to be measured). That is, the optical axis is orthogonal to the point to be measured, and the point to be measured is imaged within the depth of field (within the range of focus).

As described above, with the present exemplary embodiment, it is possible to automatically perform measurement of a dimension or shape using a measuring device.

Note that, the present invention is not limited to the above embodiments, and can be modified as needed without departing from the intent.

The measuring sensor tool may be a measuring device (measuring part) that measures dimensions (inside and outside dimensions) of a workpiece (object to be measured) by contact, instead of the electric inside-diameter measuring device. A measuring sensor tool in which a movable element (which is variously referred to as the probe 2320, a measuring jaw, a spindle, or the like) is displaceable with respect to a fixed element and measures a dimension of a workpiece by bringing the probe 2320 into contact with the workpiece or by clamping the workpiece with the probe 2320 is applicable to the above embodiments. Examples of the measuring sensor tool include calipers, micrometer heads, micrometers, digital dial gauges (indicators), test indicators (lever-type dial gauges), and the like. Examples of the non-contact measuring sensor tool include the image measuring device 4000 with telecentric lens systems, as well as capacitive sensors, laser detectors, confocal sensors, and the like.

Although the example in which the observation camera 2400 and the measuring sensor tool are provided at the hand part 2130 of one articulated robot arm part 2100 as the tool unit 2200 including the exchange means 2500 is described, the observation camera 2400 and the measuring sensor tool may be provided at the respective hand parts 2130 of separate articulated robot arm parts 2100, or the observation camera 2400 may be fixed. However, the advantages of providing the observation camera 2400 and the measuring sensor tool at the hand part 2130 of one articulated robot arm part 2100 as the tool unit 2200 are as described above.

1000 Automatic measuring system
1100 Control unit
1200 Central control unit
1300 Robot-arm drive control unit
1400 Measurement-operation control unit
1410 Observation-camera control unit
1420 Measuring-sensor-tool control unit
2000 Measuring-device main body
2010 Rotary table
2100 Articulated robot arm part
2110 Base part
2120 Arm part
2130 Hand part
2200 Tool unit
2300 Electric inside-diameter measuring unit
2310 Measuring head part

2320 Probe
2330 Motor
2400 Observation camera
2420 Image Sensor
2430 Ring illumination
2500 Exchange means
2510 Rotary plate
2520 Coupling part
2530 Camera attaching column
2540 Measuring-device attaching column
3000 Calibration Master
3100 Camera calibration chart
3110 Camera calibration mark
3120 Central camera calibration mark
3200 Measuring-sensor-tool calibration jig
3210 Camera-calibration-chart installation part
3220 sensor calibration hole
3221 First sensor calibration hole
3222 Second sensor calibration hole
3223 Third sensor calibration hole
4000 Image measuring device
3300 Calibration master
3310 Camera-calibration-chart installation frame

The invention claimed is:

1. A control method for an automatic measuring system, the automatic measuring system including:
   a measuring sensor tool configured to detect a surface of an object to be measured to measure a dimension or a shape of the object to be measured;
   a moving mechanism configured to relatively move the measuring sensor tool with respect to the object to be measured; and
   an observation camera configured to image the object to be measured, the control method comprising:
   a camera calibration mark imaging step of imaging, by the observation camera, a camera calibration mark;
   a sensor calibration part step of measuring, by the measuring sensor tool, a sensor calibration part; and
   a step of calibrating a position and posture offset between the observation camera and the measuring sensor tool, based on a position and a posture of the moving mechanism and image data acquired in the camera calibration mark imaging step, and on a position and a posture of the moving mechanism and measurement data acquired in the sensor calibration part step, wherein
   the camera calibration mark and the sensor calibration part are provided in a calibration master,
   the camera calibration mark and the sensor calibration part have a known relative position,
   the moving mechanism is one articulated robot,
   the one articulated robot includes a hand part,
   the hand part holds the observation camera and the measuring sensor tool, and
   the hand part of the articulated robot includes an exchange means for moving the observation camera and the measuring sensor tool to exchange a position of the observation camera for a position of the measuring sensor tool by rotating around an axis of the hand part.

2. The control method for the automatic measuring system according to claim 1, wherein
   the measuring sensor tool is a measuring device configured to bring a probe into contact with the object to be measured at a predetermined measurement pressure to measure the dimension of the object to be measured, and the contact between the probe and the object to be measured is not a point, but a line or a plane.

3. The control method for the automatic measuring system according to claim 1, wherein the measuring sensor tool is an image measuring device including a telecentric lens.

4. The control method for the automatic measuring system according to claim 3, wherein a part or all of the camera calibration mark and a part or all of the sensor calibration part are identical and commonly used.

5. The control method for the automatic measuring system according to claim 1, wherein
   the measuring sensor tool is an image measuring device including a telecentric lens,
   the exchange means exchanges the position of the observation camera for the position of the measuring sensor tool, and
   the observation camera and the measuring sensor tool are attached to the exchange means in such a manner that a focus plane of the observation camera when imaging the object to be measured is on the same plane as a focus plane of the measuring sensor tool when measuring the object to be measured.

6. A control method for an automatic measuring system, the automatic measuring system including:
   a measuring sensor tool configured to detect a surface of an object to be measured to measure a dimension or a shape of the object to be measured;
   a moving mechanism configured to relatively move the measuring sensor tool with respect to the object to be measured; and
   an observation camera configured to image the object to be measured, the control method comprising:
   acquiring a position and a posture of a point to be measured from image data obtained by imaging the object to be measured by the observation camera;
   causing, by the moving mechanism, the measuring sensor tool to approach the point to be measured, taking into account a position and posture offset between the observation camera and the measuring sensor tool; and
   acquiring, by the measuring sensor tool, a measurement value of the point to be measured, wherein
   the moving mechanism is one articulated robot,
   the one articulated robot includes a hand part,
   the hand part holds the observation camera and the measuring sensor tool, and
   the hand part of the articulated robot includes an exchange means for moving the observation camera and the measuring sensor tool to exchange a position of the observation camera for a position of the measuring sensor tool by rotating around an axis of the hand part.

7. An automatic measuring system comprising:
   a measuring sensor tool configured to detect a surface of an object to be measured to measure a dimension or a shape of the object to be measured;
   a moving mechanism configured to relatively move the measuring sensor tool with respect to the object to be measured; and
   an observation camera configured to image the object to be measured, wherein
   the moving mechanism is one articulated robot,
   the one articulated robot includes a hand part,
   the hand part includes an exchange means for moving the observation camera and the measuring sensor tool to exchange a position of the observation camera for a position of the measuring sensor tool by rotating around an axis of the hand part, and the hand part holds the observation camera and the measuring sensor tool via the exchanging means.

8. A recording medium storing a control program for an automatic measuring system, the automatic measuring system including:

a measuring sensor tool configured to detect a surface of an object to be measured to measure a dimension or a shape of the object to be measured;

a moving mechanism configured to relatively move the measuring sensor tool with respect to the object to be measured;

an observation camera configured to image the object to be measured; and a computer, the control program causing the computer to execute:

a camera calibration mark imaging step of imaging, by the observation camera, a camera calibration mark;

a sensor calibration part step of measuring, by the measuring sensor tool, a sensor calibration part; and a step of calibrating a position and posture offset between the observation camera and the measuring sensor tool, based on a position and a posture of the moving mechanism and image data acquired in the camera calibration mark imaging step, and on a position and a posture of the moving mechanism and measurement data acquired in the sensor calibration part step, wherein the camera calibration mark and the sensor calibration part are provided in a calibration master, the camera calibration mark and the sensor calibration part have a known relative position, the moving mechanism is one articulated robot, the one articulated robot includes a hand part, the hand part holds the observation camera and the measuring sensor tool, and the hand part of the articulated robot includes an exchange means for moving the observation camera and the measuring sensor tool to exchange a position of the observation camera for a position of the measuring sensor tool by rotating around an axis of the hand part.

9. A recording medium storing a control program for an automatic measuring system, the automatic measuring system including:

a measuring sensor tool configured to detect a surface of an object to be measured to measure a dimension or a shape of the object to be measured;

a moving mechanism configured to relatively move the measuring sensor tool with respect to the object to be measured;

an observation camera configured to image the object to be measured; and a computer, the control program causing the computer to execute:

acquiring a position and a posture of a point to be measured from image data obtained by imaging the object to be measured by the observation camera;

causing, by the moving mechanism, the measuring sensor tool to approach the point to be measured, taking into account a position and posture offset between the observation camera and the measuring sensor tool; and acquiring, by the measuring sensor tool, a measurement value of the point to be measured, wherein the moving mechanism is one articulated robot, the one articulated robot includes a hand part, the hand part holds the observation camera and the measuring sensor tool, and the hand part of the articulated robot includes an exchange means for moving the observation camera and the measuring sensor tool to exchange a position of the observation camera for a position of the measuring sensor tool by rotating around an axis of the hand part.

* * * * *